US010187091B2

(12) United States Patent
Kim et al.

(10) Patent No.: US 10,187,091 B2
(45) Date of Patent: Jan. 22, 2019

(54) DEVICE FOR PERFORMING COMMUNICATION AND METHOD THEREOF

(71) Applicant: Samsung Electronics Co., Ltd., Suwon-si, Gyeonggi-do (KR)

(72) Inventors: Hee Tae Kim, Suwon-si (KR); Bong Su Chun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/957,942

(22) Filed: Dec. 3, 2015

(65) Prior Publication Data
US 2016/0164549 A1 Jun. 9, 2016

(30) Foreign Application Priority Data

Dec. 3, 2014 (KR) .......................... 10-2014-0171824

(51) Int. Cl.
*H04B 1/00* (2006.01)
*H04W 4/80* (2018.01)
*H04W 88/06* (2009.01)
*H04W 88/10* (2009.01)

(52) U.S. Cl.
CPC ............ *H04B 1/0067* (2013.01); *H04W 4/80* (2018.02); *H04W 88/06* (2013.01); *H04W 88/10* (2013.01)

(58) Field of Classification Search
None
See application file for complete search history.

(56) References Cited

U.S. PATENT DOCUMENTS 7,848,293 B2    12/2010  Zhodzishsky et al.
8,340,580 B1 *  12/2012  Epstein ............... H04B 1/1027
                                                              455/114.2
8,654,741 B2    2/2014   Lundsgaard et al.
(Continued)

FOREIGN PATENT DOCUMENTS

KR    10-2011-0057930 A    6/2011
KR    10-2011-0075806 A    7/2011
(Continued)

OTHER PUBLICATIONS

European Office Action dated Mar. 26, 2018 issued in European Patent Application No. 15197766.7.

*Primary Examiner* — David Bilodeau
(74) *Attorney, Agent, or Firm* — Jefferson IP Law, LLP

(57) ABSTRACT

An electronic device is provided. The electronic device includes a first communication circuit configured to perform wireless communication with an external electronic device, based on a first communication protocol in which the wireless communication is possible based on at least one of a first frequency or a second frequency, a processor electrically connected to the communication circuit, and a memory electrically connected to the processor. The memory is configured to store instructions, the instructions, when executed, causing the processor to acquire information associated with at least one of a state or an operation of the electronic device and the first communication to perform the wireless communication selectively based on one of the first frequency or the second frequency, based on at least a part of the acquired information.

12 Claims, 12 Drawing Sheets

(56) References Cited

U.S. PATENT DOCUMENTS

| | | | |
|---|---|---|---|
| 8,824,346 B2 | 9/2014 | Woo et al. | |
| 9,015,487 B2 | 4/2015 | Xiao et al. | |
| 2004/0242274 A1* | 12/2004 | Corbett | H01Q 1/242 455/562.1 |
| 2006/0120302 A1* | 6/2006 | Poncini | H04W 24/00 370/254 |
| 2006/0121853 A1* | 6/2006 | Madhavan | H04L 1/0001 455/63.1 |
| 2008/0242220 A1 | 10/2008 | Wilson et al. | |
| 2008/0279129 A1* | 11/2008 | Zhodzishsky | H04W 48/18 370/311 |
| 2010/0091747 A1* | 4/2010 | Dorsey | H04B 1/036 370/338 |
| 2010/0246824 A1 | 9/2010 | Xiao et al. | |
| 2011/0216692 A1 | 9/2011 | Lundsgaard et al. | |
| 2012/0213134 A1 | 8/2012 | Woo et al. | |
| 2012/0276949 A1 | 11/2012 | Dorsey et al. | |
| 2013/0223340 A1 | 8/2013 | Jeong | |
| 2013/0235814 A1* | 9/2013 | Wietfeldt | H04W 16/14 370/329 |
| 2014/0050146 A1 | 2/2014 | Chrisikos et al. | |
| 2014/0056160 A1* | 2/2014 | Miyake | H04W 48/16 370/252 |
| 2014/0059218 A1 | 2/2014 | Ganu et al. | |
| 2014/0219194 A1* | 8/2014 | Varoglu | H04W 76/043 370/329 |
| 2014/0269650 A1 | 9/2014 | Sahota | |
| 2016/0164549 A1* | 6/2016 | Kim | H04W 88/06 455/41.2 |

FOREIGN PATENT DOCUMENTS

| | | |
|---|---|---|
| KR | 10-2012-0001798 A | 1/2012 |
| KR | 10-2012-0096858 A | 8/2012 |
| KR | 10-2013-0011882 A | 1/2013 |
| KR | 10-2013-0017439 A | 2/2013 |
| KR | 10-2013-0034892 A | 4/2013 |
| KR | 10-2013-0076455 A | 7/2013 |
| KR | 10-2013-0079704 A | 7/2013 |
| KR | 10-2013-0127117 A | 11/2013 |

\* cited by examiner

DEVICE FOR PERFORMING COMMUNICATION AND METHOD THEREOF

CROSS-REFERENCE TO RELATED APPLICATION(S)

This application claims the benefit under 35 U.S.C. § 119(a) of a Korean patent application filed on Dec. 3, 2014 in the Korean Intellectual Property Office and assigned Serial number 10-2014-0171824, the entire disclosure of which is hereby incorporated by reference.

TECHNICAL FIELD

The present disclosure relates to an electronic device performing communication and a method thereof.

BACKGROUND

With the advancement of information communication technologies, network devices, such as a base station, and the like, are installed everywhere. An electronic device transmits and receives data to and from another electronic device through the network device, thereby allowing a user to freely use a network everywhere.

The network may be, for example, a cellular network, such as third generation (3G), fourth generation (4G), and the like, a Wi-Fi network available through an access point (AP), an area network, such as Bluetooth® (BT), near field communication (NFC), and the like.

The Wi-Fi network among the networks allows a plurality of electronic devices to access to one AP and is available free of charge. For this reason, the use of the Wi-Fi network is increasing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device performing communication and a method thereof.

In accordance with an aspect of the present disclosure, an electronic device is provided. The electronic device includes a first communication circuit configured to perform wireless communication with an external electronic device, based on a first communication protocol in which the wireless communication is possible based on at least one of a first frequency or a second frequency, a processor electrically connected to the communication circuit, and a memory electrically connected to the processor. The memory stores instructions, the instructions, when executed, causing the processor to acquire information associated with at least one of a state or an operation of the electronic device and the first communication to perform the wireless communication selectively based on one of the first frequency or the second frequency, based on at least a part of the acquired information.

In accordance with another aspect of the present disclosure, an electronic device is provided. The electronic device includes a first communication circuit configured to perform wireless communication with an external electronic device, based on a first communication protocol in which the wireless communication is possible based on at least one of a plurality of frequencies, a processor electrically connected to the communication circuit, and a memory electrically connected to the processor. The memory stores instructions, the instructions, when executed, causing the processor to acquire information associated with at least one of a state or an operation of the electronic device and the first communication to dynamically perform the wireless communication selectively based on one of the plurality of frequencies, based on at least a part of the acquired information.

In accordance with another aspect of the present disclosure, a computer readable recording media recorded with an instruction is provided. The instruction, when executed by at least one processor, may cause the computer to perform a method including acquiring information associated with at least one of a state or an operation of an electronic device, selecting one of a first frequency or a second frequency based on at least a part of the acquired information, and performing wireless communication through a first communication circuit based on the selected frequency.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
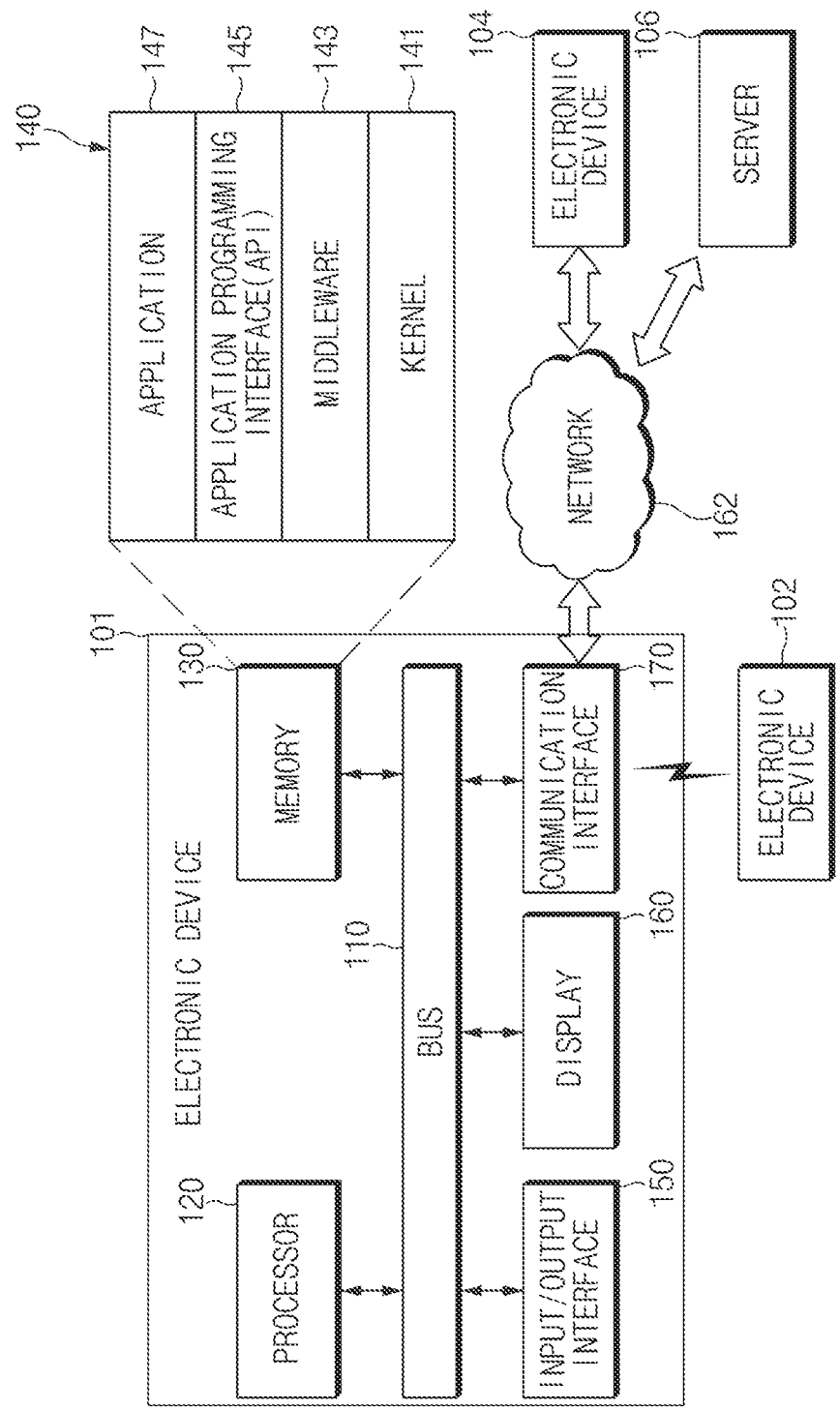
FIG. 1 is a diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In various embodiment of the present disclosure, the expressions "have", "may have", "include" and "comprise", or "may include" and "may comprise" used herein indicate existence of corresponding features (e.g., elements, such as numeric values, functions, operations, or components) but do not exclude presence of additional features.

In various embodiment of the present disclosure, the expressions "A or B", "at least one of A or/and B", or "one or more of A or/and B", and the like, used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like, used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., the first element) is referred to as being "directly coupled with/to" or "directly connected to" another element (e.g., the second element), it should be understood that there are no intervening element (e.g., the third element).

According to the situation, the expression "configured to" used herein may be used as, for example, the expression "suitable for", "having the capacity to", "designed to", "adapted to", "made to", or "capable of". The term "configured to" must not mean only "specifically designed to" be performed by hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may be an electronic device which performs communication using a Wi-Fi network, which will be described with reference to FIGS. 1 to 11. The electronic device may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances capable of performing communication using a Wi-Fi network. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), which are capable of performing communication using a Wi-Fi network.

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like), which are capable of performing communication using a Wi-Fi network. The electronic devices according to an embodiment of the present disclosure may be one or more combinations of the above-mentioned devices.

According to an embodiment of the present disclosure, an electronic device may be a flexible electronic which performs communication using a Wi-Fi network.

In addition, electronic devices according to various embodiments of the present disclosure are not limited to the above-mentioned devices, and may include new electronic devices according to technology development.

Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an electronic device in a network environment according to various embodiments of the present disclosure.

Referring to FIG. 1, an electronic device 101 may include a bus 110, a processor 120, a memory 130, an input/output (I/O) interface 150, a display 160, and a communication interface 170. According to an embodiment of the present disclosure, the electronic device 101 may not include at least one of the above-described components or may further include other component(s).

The bus 110 may interconnect the above-described components 110 to 170 and may be a circuit for conveying communications (e.g., a control message and/or data) among the above-described components.

The processor 120 may include one or more of a CPU, an application processor (AP), or a communication processor (CP). The processor 120 may perform, for example, data processing or an operation associated with control or communication of at least one other component(s) of the electronic device 101.

The memory 130 may include a volatile and/or nonvolatile memory. The memory 130 may store instructions or data associated with at least one other component(s) of the electronic device 101. According to various embodiments of the present disclosure, the memory 130 may store software and/or a program 140. The program 140 may include, for example, a kernel 141, a middleware 143, an application programming interface (API) 145, and/or an application (or an application program) 147. At least a portion of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform a mediation role such that the API 145 or the application program 147 communicates with the kernel 141 to exchange data. Furthermore, the middleware 143 may process task requests received from the application program 147 according to a priority. For example, the middleware 143 may assign the priority, which makes it possible to use a system resource (e.g., the bus 110, the processor 120, the memory 130, and the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for a file control, a window control, image processing, a character control, and the like.

The I/O interface 150 may transmit an instruction or data, input from a user or another external device, to other component(s) of the electronic device 101. Furthermore, the I/O interface 150 may output an instruction or data, received from other component(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a portion of a user's body.

The communication interface 170 may establish communication between the electronic device 101 and an external electronic device (e.g., a first external electronic device 102, a second external electronic device 104, or a server 106). For example, the communication interface 170 may be connected to a network 162 through wireless communication or wired communication to communicate with the external device (e.g., the second external electronic device 104 or the server 106).

The wireless communication may include at least one of, for example, long term evolution (LTE), LTE advanced (LTE-A), code division multiple access (CDMA), wideband CDMA (WCDMA), universal mobile telecommunications service (UMTs), wireless broadband (WiBro), global system for mobile communications (GSM), and the like, as cellular communication protocol. The wired communication may include at least one of, for example, a universal serial bus (USB), a high definition multimedia interface (HDMI), a recommended standard-232 (RS-232), or a plain old telephone service (POTS). The network 162 may include at least one of telecommunications networks, for example, a computer network (e.g., local area network (LAN) or wide area network (WAN)), an internet, or a telephone network.

Each of the first external electronic device 102 and the second external electronic device 104 may be a device of which the type is different from or the same as that of the electronic device 101. According to an embodiment of the present disclosure, the server 106 may include a group of one or more servers. According to various embodiments of the present disclosure, all or a part of operations that the electronic device 101 will perform may be executed by another or plural electronic devices (e.g., the first external electronic device 102 and the second external electronic device 104 and the server 106). According to an embodiment of the present disclosure, in the case where the electronic device 101 executes any function or service automatically or in response to a request, the electronic device 101 may not perform the function or the service internally. However, alternatively or additionally, the electronic device 101 may request at least a portion of a function associated with the electronic device 101 at other device (e.g., the first external electronic device 102 or the second external electronic device 104 or the server 106). The other electronic device (e.g., the first external electronic device 102 or the second external electronic device 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
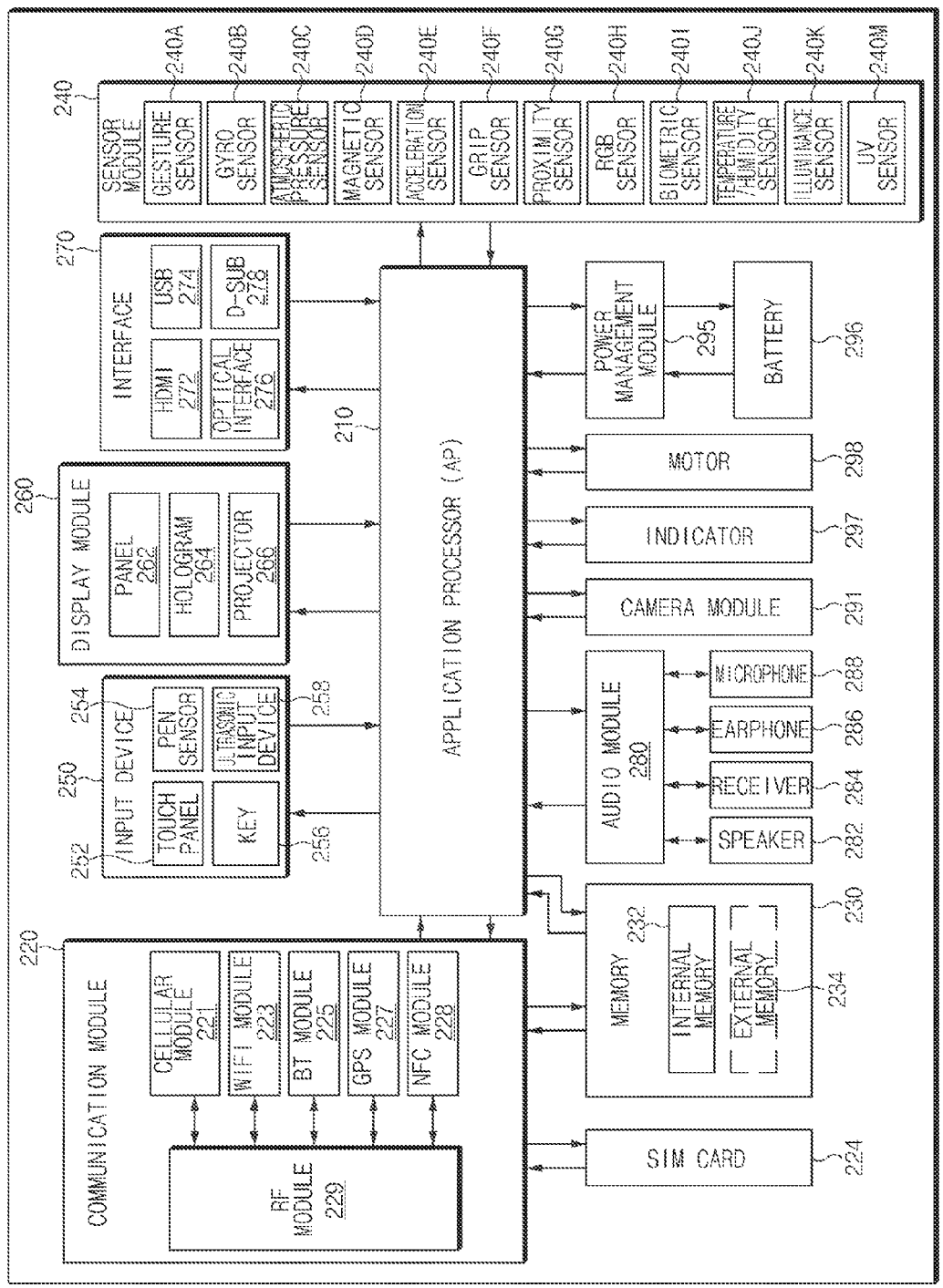
FIG. 2 is a block diagram illustrating an electronic device according to various embodiments of the present disclosure.

FIG. 2 is a block diagram illustrating an electronic device according to various embodiments of the present disclosure.

Referring to FIG. 2, an electronic device may include, for example, all or a part of an electronic device 101 illustrated in FIG. 1. The electronic device may include one or more application processors 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may drive an OS or an application to control a plurality of hardware or software components connected to the AP 210 and may process and compute a variety of data. The AP 210 may be implemented with a system on chip (SoC), for example. According to an embodiment of the present disclosure, the AP 210 may further include a graphics processing unit (GPU) and/or an image signal processor (ISP). The AP 210 may include at least a part (e.g., a cellular module 221) of components illustrated in FIG. 2. The AP 210 may load and process an instruction or data, which is received from at least one of other components (e.g., a nonvolatile memory), and may store a variety of data at a nonvolatile memory.

The communication module 220 may be configured the same as or similar to a communication interface 170 of FIG. 1. The communication module 220 may include a cellular module 221, a Wi-Fi module 223, a Bluetooth (BT) module 225, a GPS module 227, a near field communication (NFC) module 228, and a radio frequency (RF) module 229.

The cellular module 221 may provide voice communication, video communication, a character service, an Internet service, and the like, through a communication network. According to an embodiment of the present disclosure, the cellular module 221 may perform discrimination and authentication of an electronic device within a communication network using a SIM 224 (e.g., the SIM card 224), for example. According to an embodiment of the present disclosure, the cellular module 221 may perform at least a portion of functions that the AP 210 provides. According to an embodiment of the present disclosure, the cellular module 221 may include a CP.

Each of the Wi-Fi module 223, the BT module 225, the GPS module 227, and the NFC module 228 may include a processor for processing data exchanged through a corresponding module, for example. According to an embodiment of the present disclosure, at least a portion (e.g., two or more components) of the cellular module 221, the Wi-Fi module 223, the BT module 225, the GPS module 227, and the NFC module 228 may be included within one integrated circuit (IC) or an IC package.

The RF module 229 may transmit and receive a communication signal (e.g., an RF signal). The RF module 229 may include a transceiver, a power amplifier module (PAM), a frequency filter, a low noise amplifier (LNA), an antenna, and the like. According to various embodiments of the present disclosure, at least one of the cellular module 221, the Wi-Fi module 223, the BT module 225, the GPS module 227, or the NFC module 228 may transmit and receive an RF signal through a separate RF module.

The SIM card 224 may include, for example, a SIM and may include unique identify information (e.g., integrated circuit card identifier (ICCID)) or subscriber information (e.g., integrated mobile subscriber identity (IMSI)).

The memory 230 (e.g., the memory 130) may include an embedded (or internal) memory 232 or an external memory 234. For example, the internal memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 234 may include a flash drive, for example, compact flash (CF), secure digital (SD), micro-SD, mini-SD, extreme digital (xD), multimedia card (MMC), a memory stick, and the like. The external memory 234 may be functionally and/or physically connected to the electronic device through various interfaces.

The sensor module 240 may measure, for example, a physical quantity or may detect an operation state of the electronic device. The sensor module 240 may convert the measured or detected information to an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red, green, blue (RGB) sensor), a living body sensor 240I, a temperature/humidity sensor 240J, an illuminance sensor 240K, or an ultraviolet (UV) sensor 240M. Although not illustrated, additionally or generally, the sensor module 240 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 240 may further include a control circuit for controlling at least one or more sensors included therein. According to an embodiment of the present disclosure, the electronic device may further include a processor which is a part of the AP 210 or independent of the AP 210 and is configured to control the sensor module 240. The processor may control the sensor module 240 while the AP 210 remains at a sleep state.

The input device 250 may include, for example, a touch panel 252, a (digital) pen sensor 254, a key 256, or an ultrasonic input unit 258. The touch panel 252 may use at least one of capacitive, resistive, infrared and ultrasonic detecting methods. In addition, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, and the like. The ultrasonic input device 258 may detect an ultrasonic signal, which is generated from an input device, through a microphone (e.g., a microphone 288) and may determine data corresponding to the detected ultrasonic signal.

The display module 260 (e.g., the display 160) may include a panel 262, a hologram device 264, or a projector 266. The panel 262 may be configured the same as or similar to the display 160 of FIG. 1. The panel 262 and the touch panel 252 may be integrated into a single module. The hologram device 264 may display a stereoscopic image in a space using a light interference phenomenon. The projector 266 may project light onto a screen so as to display an image. The screen may be arranged in the inside or the outside of the electronic device. According to an embodiment of the present disclosure, the display module 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in a communication interface 170 illustrated in FIG. 1. Additionally or generally, the interface 270 may include, for example, a mobile high definition link (MHL) interface, an SD card/multi-media card (MMC) interface, or an infrared data association (IrDA) standard interface.

The audio module 280 may convert a sound and an electric signal in dual directions. At least a portion of the audio module 280 may be included, for example, in the I/O interface 150 illustrated in FIG. 1. The audio module 280 may process, for example, sound information that is input or output through a speaker 282, a receiver 284, an earphone 286, or the microphone 288.

The camera module 291 for shooting a still image or a video may include, for example, at least one image sensor (e.g., a front sensor or a rear sensor), a lens, an ISP, or a flash (e.g., an LED or a xenon lamp).

The power management module 295 may manage, for example, power of the electronic device. According to an embodiment of the present disclosure, a power management integrated circuit (PMIC) a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery or a solar battery.

The indicator 297 may display a specific state of the electronic device or a portion thereof (e.g., the AP 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device. The processing device for supporting a mobile TV may process media data according to the standards of digital multimedia broadcasting (DMB), digital video broadcasting (DVB), MediaFlo™, and the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 3:
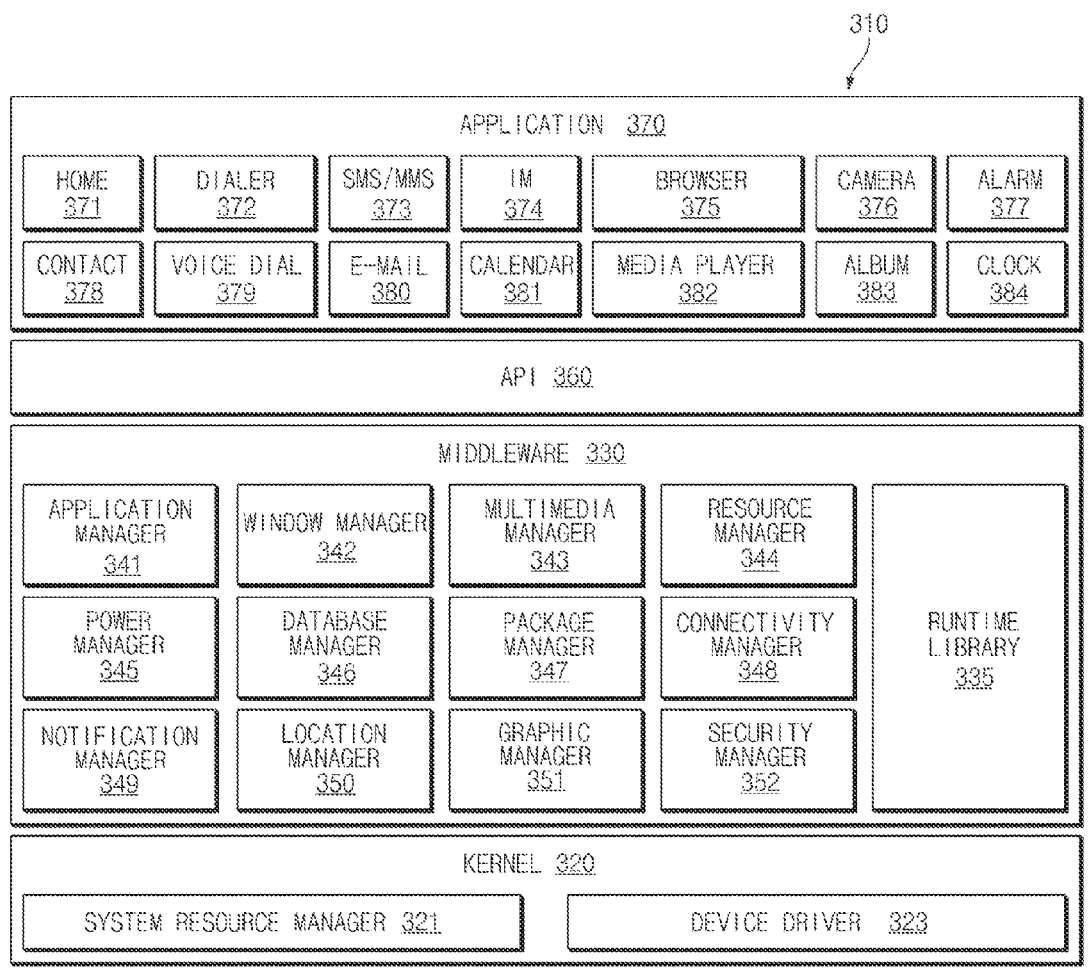
FIG. 3 illustrates a block diagram of a program module according to various embodiments of the present disclosure.

FIG. 3 illustrates a block diagram of a program module according to various embodiments of the present disclosure.

Referring to FIG. 3, a program module 310 (e.g., the program 140) may include an OS to control resources associated with an electronic device (e.g., the electronic device 101), and/or diverse applications (e.g., the application program 147) driven on the OS. The OS may be, for example, android, iOS, windows, symbian, tizen, or bada.

The program module 310 may include a kernel 320, a middleware 330, an API 360, and/or an application 370. At least a part of the program module 310 may be preloaded on an electronic device or may be downloadable from an external electronic device (e.g., the server 106).

The kernel 320 (e.g., the kernel 141) may include, for example, a system resource manager 321 or a device driver 323. The system resource manager 321 may perform control, allocation, or retrieval of system resources. According to an embodiment of the present disclosure, the system resource manager 321 may include a process managing part, a memory managing part, or a file system managing part. The device driver 323 may include, for example, a display driver, a camera driver, a Bluetooth driver, a common memory driver, a USB driver, a keypad driver, a Wi-Fi driver, an audio driver, or an inter-process communication (IPC) driver.

The middleware 330 may provide, for example, a function which the application 370 needs in common, or may provide diverse functions to the application 370 through the API 360 to allow the application 370 to efficiently use limited system resources of the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module which is used by a compiler to add a new function through a programming language while the application 370 is being executed. The runtime library 335 may perform I/O management, memory management, or capacities about arithmetic functions.

The application manager 341 may manage, for example, a life cycle of at least one application of the application 370. The window manager 342 may manage a graphical user interface (GUI) resource which is used in a screen. The multimedia manager 343 may identify a format necessary for playing diverse media files, and may perform encoding or decoding of media files by using a codec suitable for the format. The resource manager 344 may manage resources, such as a storage space, memory, or source code, of at least one application of the application 370.

The power manager 345 may operate, for example, with a basic input/output system (BIOS) to manage a battery or power, and may provide power information for an operation of an electronic device. The database manager 346 may generate, search for, or modify database which is to be used in at least one application of the application 370. The package manager 347 may install or update an application which is distributed in the form of package file.

The connectivity manager 348 may manage, for example, wireless connection, such as Wi-Fi or BT. The notification manager 349 may display or notify an event, such as an arrival message, a promise, or a proximity notification, in a mode that does not disturb a user. The location manager 350 may manage location information of an electronic device. The graphic manager 351 may manage a graphic effect that is provided to a user, or manage a user interface relevant thereto. The security manager 352 may provide a general security function necessary for system security or user authentication. According to an embodiment of the present disclosure, in the case where an electronic device (e.g., the electronic device 101) includes a telephony function, the middleware 330 may further includes a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may remove a part of the preexisting components, dynamically, or may add a new component thereto.

The API 360 (e.g., the API 145) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 370 (e.g., the application program 147) may include, for example, one or more applications capable of providing functions for a home 371, a dialer 372, a short message service (SMS)/multimedia messaging service (MMS) 373, an instant message (IM) 374, a browser 375, a camera 376, an alarm 377, a contact 378, a voice dial 379, an e-mail 380, a calendar 381, a media player 382, an album 383, and a clock 384, or for offering health care (e.g., measuring an exercise quantity or blood sugar) or environment information (e.g., atmospheric pressure, humidity, or temperature).

According to an embodiment of the present disclosure, the application 370 may include an application (hereinafter referred to as "information exchanging application" for descriptive convenience) to support information exchange between the electronic device (e.g., the electronic device 101) and an external electronic device (e.g., the first external electronic device 102 or the second external electronic device 104). The information exchanging application may include, for example, a notification relay application for transmitting specific information to the external electronic device, or a device management application for managing the external electronic device.

For example, the notification relay may include a function of transmitting notification information, which arise from other applications (e.g., applications for SMS/MMS, e-mail, health care, or environmental information), to an external electronic device (e.g., the first external electronic device 102 or the second external electronic device 104). Additionally, the information exchanging application may receive, for example, notification information from an external electronic device and provide the notification information to a user. The device management application may manage (e.g., install, delete, or update), for example, at least one function (e.g., turn-on/turn-off of an external electronic device itself (or a part of components) or adjustment of brightness (or resolution) of a display) of the external electronic device (e.g., the first external electronic device 102 or the second external electronic device 104) which communicates with the electronic device, an application running in the external electronic device, or a service (e.g., a call service or a message service) provided from the external electronic device.

According to an embodiment of the present disclosure, the application 370 may include an application (e.g., a health care application) which is assigned in accordance with an attribute (e.g., an attribute of a mobile medical device as a kind of electronic device) of the external electronic device (e.g., the first external electronic device 102 or the second external electronic device 104). According to an embodiment of the present disclosure, the application 370 may include an application which is received from an external electronic device (e.g., the server 106 or the first external electronic device 102 or the second external electronic device 104). According to an embodiment of the present disclosure, the application 370 may include a preloaded application or a third party application which is downloadable from a server. The component titles of the program module 310 according to the embodiment of the present disclosure may be modifiable depending on kinds of OSs.

According to various embodiments of the present disclosure, at least a portion of the program module 310 may be implemented by software, firmware, hardware, or a combination of two or more thereof. At least a portion of the program module 310 may be implemented (e.g., executed), for example, by a processor (e.g., the AP 210). At least a portion of the program module 310 may include, for example, modules, programs, routines, sets of instructions, or processes, and the like for performing one or more functions.

Figure 4:
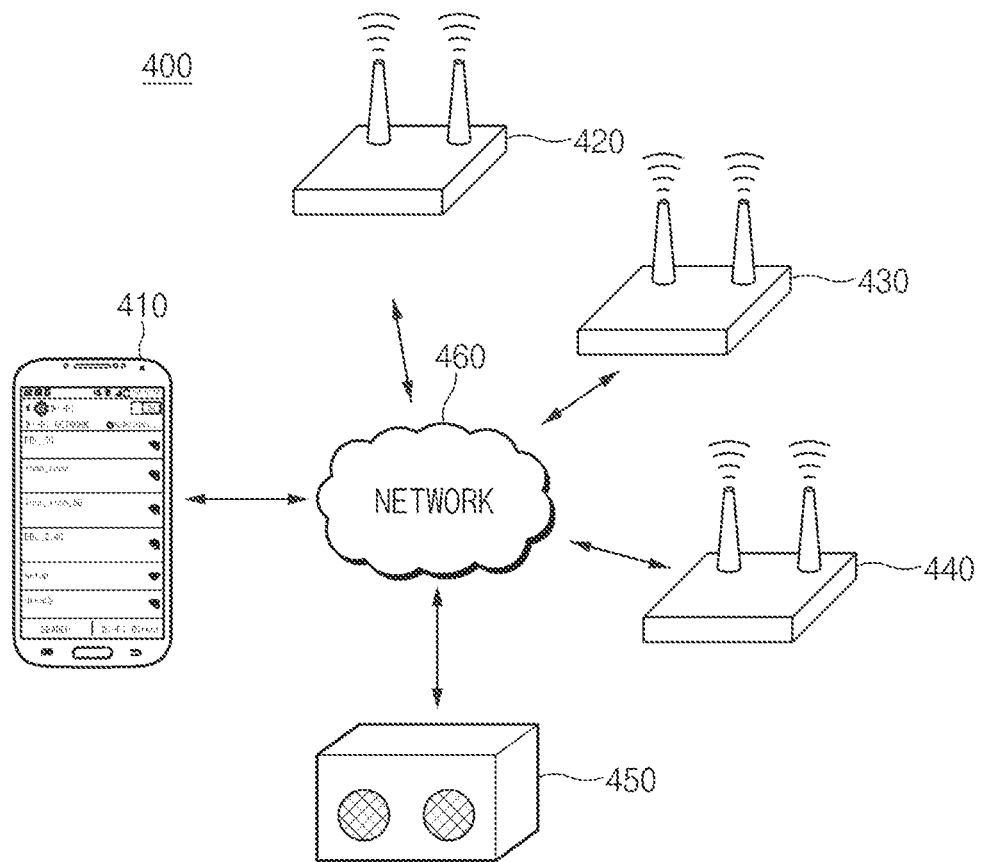
FIG. 4 is a configuration diagram of a Wi-Fi communication system according to various embodiments of the present disclosure.

FIG. 4 is a configuration diagram of a Wi-Fi communication system according to various embodiments of the present disclosure.

Referring to FIG. 4, a Wi-Fi communication system 400 may include an electronic device 410, a first AP 420, a second AP 430, a dual AP 440, a BT device 450 connected with the electronic device 410 through BT, and a network 460. The Wi-Fi communication system 400 may be at least one of various embodiments of the present disclosure, and the present disclosure may not be restrictively interpreted through FIG. 4.

According to various embodiments of the present disclosure, the electronic device 410 may perform communication using a Wi-Fi network. The electronic device 410 may be connected to an AP which outputs a Wi-Fi signal to perform communication using the Wi-Fi network. A plurality of frequencies may be assigned to the Wi-Fi network. For example, a 5 GHz band as well as a 2.4 GHz band may be currently assigned to the Wi-Fi network. In addition, even though not used currently, various frequency bands may be assigned to the Wi-Fi network in the future. Note that various embodiments of the present disclosure do not disclaim electronic devices and APs which use frequency bands-to-be as well as the currently used 2.4 GHz and 5 GHz frequency bands.

According to various embodiments of the present disclosure, the electronic device 410 may receive Wi-Fi signals of APs around the electronic device 410 and may search for at least one or more of the first AP 420, the second AP 430, and the dual AP 440. The first AP 420 may be an AP supporting a first frequency (e.g., 2.4 GHz), and the second AP 430 may be an AP supporting a second frequency (e.g., 5 GHz). Furthermore, the dual AP 440 may an AP supporting both the first frequency and the second frequency. According to various embodiments of the present disclosure, the dual AP 440 may further support other frequencies as well as the first frequency and the second frequency.

According to various embodiments of the present disclosure, target objects that the electronic device 410 is capable of searching for may not be limited to the first AP 420, the second AP 430, and the dual AP 440 and may include other external electronic devices capable of performing communication. For example, the external electronic devices may include a device which supports the Wi-Fi Direct.

According to various embodiments of the present disclosure, as illustrated in FIG. 4, the electronic device 410 may display at least one or more APs found on a screen thereof. According to various embodiments of the present disclosure, the electronic device 410 may arrange the found at least one or more APs for each level of indicators (e.g., ) indicating Wi-Fi performance, such as Wi-Fi sensitivity, Wi-Fi signal strength (e.g., received signal strength indication (RSSI)), and the like. In contrast, the electronic device 410 may arrange the found at least one or more APs in an alphabetical order of names respectively set to the at least one or more APs found. Below, the Wi-Fi performance will be described using the Wi-Fi signal strength.

According to various embodiments of the present disclosure, the electronic device 410 may display a user interface (UI) for arranging the at least one or more APs found, on the screen. For example, the electronic device 410 may display a UI for arranging the found at least one or more APs in an order of Wi-Fi signal strength levels or in an alphabetical order of names thereof.

According to various embodiments of the present disclosure, the electronic device 410 may perform communication using one of the first frequency and the second frequency, based on a user setting. The user setting may include a first case where the first frequency is always used if the electronic device 410 connects with the dual AP 440, a second case where the second frequency is always used if the electronic device 410 connects with the dual AP 440, and a third case where the first frequency or the second frequency is selectively used according to a state of the electronic device 410. The electronic device 410 may display a UI for selecting the first case, the second case, and the third case. The electronic device 410 may receive a user input for selection of a case from a user and may use the selected case as the user setting. According to various embodiments of the present disclosure, the electronic device 410 may select one of the cases without a user input.

According to various embodiments of the present disclosure, for the third case, the electronic device 410 may determine whether to use either the first frequency or the second frequency. The electronic device 410 may compare a Wi-Fi signal strength level corresponding to the first frequency and a Wi-Fi signal strength level corresponding to the second frequency and may determine whether to use either the first frequency or the second frequency, based on the comparison result. For example, in the case where an indicator corresponding to the first frequency is, for example, " " and an indicator corresponding to the second frequency is, for example, " ", the electronic device 410 may establish a Wi-Fi network which uses the first frequency. In the case where a Wi-Fi signal strength level when the first frequency is used is the same that when the second frequency is used, the electronic device 410 may establish the Wi-Fi network using one, having a relatively excellent throughput, from among the first and second frequencies.

According to various embodiments of the present disclosure, the first frequency may be, for example, 2.4 GHz, and the second frequency may be, for example, 5 GHz. Under the same condition, the throughput of the 5 GHz Wi-Fi network may be higher than that of the 2.4 GHz Wi-Fi network. In addition, if the 5 GHz Wi-Fi network uses a channel bonding technique, the throughput of the 5 GHz Wi-Fi network may be much higher than that of the 2.4 GHz Wi-Fi network. Accordingly, in the case where a Wi-Fi signal strength level when the first frequency is used is the same that when the second frequency is used, the electronic device 410 may determine to use a band of which the throughput is relatively excellent, for example, a frequency of 5 GHz.

According to various embodiments of the present disclosure, the electronic device 410 may determine to use one of the first frequency and the second frequency, based on at least one or more of a state of charge (SOC), current consumption, and quantity of heat. For example, in the case where the state of charge is lower than a specific level, a frequency need be used such that battery consumption is reduced. Furthermore, the case that current consumption or quantity of heat is greater than or equal to a specific level may be viewed as a state where a processor of the electronic device 410 is overloaded. In this case, a frequency need be used such that current consumption is reduced.

According to various embodiments of the present disclosure, current consumption when Wi-Fi communication is performed using 2.4 GHz may be smaller than that when Wi-Fi communication is performed using 5 GHz. Accordingly, if the state of charge is lower than a specific level or the current consumption or quantity of heat is greater than or equal to a specific level, the electronic device 410 may determine to perform Wi-Fi communication using a frequency of a relatively low band.

According to various embodiments of the present disclosure, the electronic device 410 may determine to perform Wi-Fi communication in which one of the first frequency and the second frequency is used thereon, based on whether the electronic device 410 performs communication through another network in which the first frequency or the second frequency is used. Since a currently used BT network uses a 2.4 GHz band, mutual interference may occur if the 2.4 GHz Wi-Fi communication and the BT communication are performed at the same time, thereby lowering performance about each of the 2.4 GHz Wi-Fi communication and the BT communication. For example, in the case where the electronic device 410 is paired with the BT device 450, for example, a 2.4 GHz BT speaker, the electronic device 410 may determine to perform the 5 GHz Wi-Fi communication.

According to various embodiments of the present disclosure, the electronic device 410 may hand the first frequency or the second frequency, which is determined as being used as a Wi-Fi communication frequency band, over to the second frequency or the first frequency. The frequency handover may be performed based on one or more of factors for determining the first frequency or the second frequency. For example, the electronic device 410 may compare a Wi-Fi signal strength level corresponding to the first frequency and a Wi-Fi signal strength level corresponding to the second frequency and may perform the frequency handover based on the comparison result. In the case where as a distance from the dual AP 440 increases a Wi-Fi signal strength level of the first frequency becomes relatively good compared to the second frequency, the electronic device 410 using the second frequency may change the second frequency into the first frequency. In general, a straight characteristic of a high frequency may be stronger than that of a low frequency, while a diffraction characteristic of the high frequency may be weaker than that of the low frequency. For this reason, in the case where a wall is placed between the electronic device 410 and the dual AP 440, a Wi-Fi signal strength level about the high frequency may become relatively weak. For example, in the case where the electronic device 410 using the high frequency moves into a room from a living room in which the dual AP 440 is located, the electronic device 410 may change the high frequency, which is being used, into the low frequency.

According to an embodiment of the present disclosure, a Wi-Fi signal strength level corresponding to the first frequency may become lower than that corresponding to the second frequency while the electronic device 410 establishes a Wi-Fi network using the first frequency. In this case, the electronic device 410 may change the first frequency (e.g., 2.4 GHz), which is being used, into the second frequency (e.g., 5 GHz) of a higher band of which the throughput is relatively excellent.

According to an embodiment of the present disclosure, the electronic device 410 may change a frequency based on at least one or more of a state of charge, current consumption, and quantity of heat thereof. For example, in the case where the state of charge of the electronic device 410 becomes lower than a specific level with the lapse of time, the electronic device 410 which uses a frequency causing great current consumption may change a frequency, which is being used, into a frequency causing small current consumption. In contrast, in the case where the electronic device 410 is connected to power or in the case where the state of charge of the electronic device 410 increases over a level, the electronic device 410 which uses a frequency causing small current consumption may change a frequency, which is being used, into a frequency causing great current consumption.

According to an embodiment of the present disclosure, in the case where the current consumption or the quantity of heat of the electronic device 410 is over a level due to execution of at least one or more applications or activation of a sensor, and the like, the electronic device 410 which uses a frequency causing great current consumption may change a frequency, which is being used, into a frequency causing small current consumption.

Furthermore, the electronic device 410 may perform frequency handover based on whether the electronic device 410 is performing communication through another network in which the first frequency or the second frequency is used. For example, in the case where the electronic device 410 which is using 2.4 GHz uses 2.4 GHz BT network, the electronic device 410 may change 2.4 GHz, which is being used, into 5 GHz. In addition, in the case where the 2.4 GHz BT network that the electronic device 410 is using is inactivated, the electronic device 410 may change 5 GHz, which is being used, into 2.4 GHz.

According to an embodiment of the present disclosure, in the case where the dual AP 440 is found, the electronic device 410 may determine whether to display the dual AP 440 as one AP or to whether to display an AP about the first frequency and an AP about the second frequency on the screen independently. Displaying of the dual AP 440 may be determined according to a user input which is provided through a UI displayed on the screen.

According to an embodiment of the present disclosure, the first AP 420, the second AP 430, and the dual AP 440 may provide Wi-Fi signals to allow the electronic device 410 to use the Wi-Fi network. The first AP 420, the second AP 430, and the dual AP 440 may be located at various spots, such as a home, a company, a restaurant, and the like. At least one of the first AP 420, the second AP 430, and the dual AP 440 may be an AP which operates through a hotspot function on another electronic device (not illustrated).

According to an embodiment of the present disclosure, an embodiment of the present disclosure is exemplified in FIG. 4 as each of the first AP 420, the second AP 430, and the dual AP 440 has a dual antenna. However, the scope and spirit of the present disclosure may not be limited thereto. For example, the first AP 420 may use one antenna, and the second AP 430 may use three antennas.

In FIG. 4, an embodiment of the present disclosure is exemplified as the BT device 450 is a BT speaker. However, the BT device 450 may be a variety of electronic devices which are able to be paired with the electronic device 410 using a BT network. For example, the BT device 450 may be a BT mouse, a BT keyboard, and the like. Furthermore, the BT device 450 may be an electronic device, such as a smartphone, and the like.

The network 460 (e.g., the network 162 illustrated in FIG. 1) may respectively connect the electronic device 410, the he first AP 420, the second AP 430, and the dual AP 440 included in the Wi-Fi communication system 400. In this case, the network 460 may indicate a connection structure in which information exchange between nodes, such as electronic devices and servers, is possible. The network 460 may include, but not limited to, Wi-Fi, BT, Bluetooth low energy (BLE), NFC, GPS, or cellular communication (e.g., third generation (3G), LTE, LTE-A, CDMA, WCDMA, UMTS, WiBro, and GSM), and the like.

A service which searches for at least one or more APs and performs communication using one of the found APs may be provided through an application installed on the electronic device 410. Here, the application may indicate an application program and may include, for example, an app executed on the electronic device 410.

Figure 5:
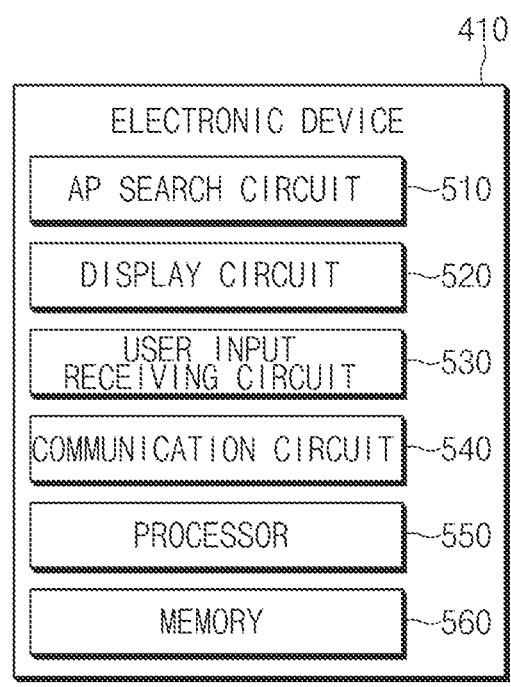
FIG. 5 is a configuration diagram of an electronic device according to various embodiments of the present disclosure.

FIG. 5 is a configuration diagram of an electronic device according to various embodiments of the present disclosure.

Referring to FIG. 5, the electronic device 410 may include an AP search circuit 510, a display circuit 520, a user input receiving circuit 530, a communication circuit 540, a processor 550, a memory 560, and the like. The electronic device 410 illustrated in FIG. 4 may correspond to one or more of various embodiments of the present disclosure. Various modifications or changes about the electronic device 410 may be made based on components illustrated in FIG. 5. For example, the electronic device 410 may further include a user interface which receives any instruction or information, for example, a user input from a user. In this case, the user interface may be an input device, such as a keyboard, a mouse, and the like, or may be a GUI expressed on an image display device.

The AP search circuit 510 may search for at least one or more APs which are connectable through the communication circuit 540. The APs may include the first AP 420 supporting a first frequency, the second AP 430 supporting a second frequency, and the dual AP 440 supporting both the first frequency and the second frequency. Below, it may be assumed that the first frequency is 2.4 GHz and the second frequency is 5 GHz. As described above, an object that the electronic device 410 performs communication with may not be limited to an AP. For example, the object may be comprehensively interpreted as being an external electronic device including an AP, and the like. Accordingly, the AP search circuit 510 may search for a smartphone and the like using the Wi-Fi direct, and the like, as well as an AP.

The display circuit 520 may display information associated with at least one external electronic device connectable through the communication circuit 540, on a screen. For example, the display circuit 520 may display at least one or more APs found by the AP search circuit 510, on a screen of the electronic device 410. The display circuit 520 may include, for example, a configuration which is at least the same as or similar to the display 160 illustrated in FIG. 1. Furthermore, an operation of the display circuit 520 may be performed based on an instruction or a signal received from the processor 550.

According to various embodiments of the present disclosure, the display circuit 520 may provide a UI which is used to determine whether to display the dual AP 440 as one AP or whether to display an AP about 2.4 GHz and an AP about 5 GHz independently. In addition, as selected through the UI, the display circuit 520 may display the dual AP 440 as one AP or may display an AP about 2.4 GHz and an AP about 5 GHz independently.

The displayed at least one or more APs may be arranged through various conditions. For example, the at least one or more APs may be arranged for a Wi-Fi sensitivity or for a Wi-Fi signal strength level, such as Wi-Fi signal strength, and the like. Alternatively, the at least one or more APs may be arranged based on an alphabetical order of names assigned to the at least one or more APs. Arrangement of at least one or more APs will be described with reference to FIG. 6.

The user input receiving circuit 530 may receive a user input selecting one of at least one or more APs displayed on the screen. The user input receiving circuit 530 may include, for example, a configuration which is at least the same as or similar to the touch panel 252 illustrated in FIG. 2. According to various embodiments of the present disclosure, it may be assumed that the user input receiving circuit 530 receives a user input selecting the dual AP 440 which supports both 2.4 GHz and 5 GHz.

The communication circuit 540 may perform communication, in which one of 2.4 GHz and 5 GHz is used, based on a user setting, as a response to the user input received through the user input receiving circuit 530.

The communication circuit 540 may include a first communication circuit and a second communication circuit. The first communication circuit may perform wireless communication with an external electronic device, based on a first communication protocol (e.g., an 802.11 protocol) in which wireless communication is possible using the first frequency (e.g., 2.4 GHz) and/or the second frequency (e.g., 5 GHz). The second communication circuit may perform wireless communication with an external electronic device, based on a second communication protocol (e.g., a Bluetooth protocol) in which wireless communication is possible in a frequency domain the same as or similar to the first frequency.

The processor 550 may include, for example, a configuration which is at least the same as or similar to the processor 120 illustrated in FIG. 1.

The processor 550 may acquire information associated with at least one of a state or an operation of the electronic device 410. The state or operation of the electronic device 410 may include at least one of a power state, a temperature, a state of charge (SOC), a battery charging operation, current consumption, and the quantity of heat. Furthermore, the state or operation of the electronic device 410 that the processor 550 collects may include information about whether the second communication circuit is operating.

The processor 550 may select a frequency, which the communication circuit 540, for example, the first communication circuit will use, from among the first frequency (e.g., 2.4 GHz) and the second frequency (e.g., 5 GHz). The processor 550 may allow the first communication circuit to perform wireless communication selectively using one of 2.4 GHz and 5 GHz, based on at least a part of information associated with at least one of the state or the operation of the electronic device 410. In this case, the processor 550 may allow the first communication circuit to perform wireless communication selectively using one of 2.4 GHz or 5 GHz.

Similarly, in the case where the first communication circuit uses a plurality of frequencies variously as well as the first and second frequencies, the processor 550 may allow the first communication circuit to dynamically perform wireless communication selectively using at least one of the plurality of frequencies, based on at least a part of information associated with at least one of the state or the operation of the electronic device 410 previously collected.

The processor 550 according to various embodiments of the present disclosure may compare a Wi-Fi signal strength level corresponding to the 2.4 GHz and a Wi-Fi signal strength level corresponding to 5 GHz and may determine to use one of 2.4 GHz or 5 GHz on the communication circuit 540. If a Wi-Fi signal strength level when 2.4 GHz is used is the same as that when 5 GHz is used, the processor 550 may determine to use 5 GHz of a high band, of which the throughput is excellent, on the communication circuit 540.

Furthermore, the processor 550 may determine to use one of 2.4 GHz or 5 GHz on the communication circuit 540, based on at least one or more of a state of charge, current consumption, and the quantity of heat. For example, a frequency of a 2.4 GHz Wi-Fi network may be lower than that of a 5 GHz Wi-Fi network. In this case, since signal attenuation of the 2.4 GHz Wi-Fi network is smaller than that of the 5 GHz Wi-Fi network, current consumption of the 2.4 GHz Wi-Fi network may be smaller than that of the 5 GHz Wi-Fi network. Accordingly, in the case where the state of charge is lower than a specific level, the processor 550 may determine to use 2.4 GHz on the communication circuit 540, and thus, the power of the electronic device 410 may be maintained relatively long. Furthermore, in the case where current consumption or the quantity of heat is greater than or equal to a specific level, the processor 550 may select 2.4 GHz to prevent sudden consumption of the battery and to reduce the quantity of heat or a specific absorption rate (SAR) value.

The processor 550 according to various embodiments of the present disclosure may determine to use one of 2.4 GHz or 5 GHz on the communication circuit 540, based on whether the communication circuit 540 is using 2.4 GHz or 5 GHz. For example, since the BT network uses 2.4 GHz, the processor 550 may determine to use 5 GHz on the communication circuit 540 such that interference with the BT network does not occur when the communication circuit 540 is using the BT network.

According to various embodiments of the present disclosure, the processor 550 may switch the 2.4 GHz Wi-Fi network or the 5 GHz Wi-Fi network, which is determined as being used on the communication circuit 540, into the 5 GHz Wi-Fi network or the 2.4 GHz Wi-Fi network and may change a usable frequency. A reference which is used for the processor 550 to change a usable frequency may correspond to a reference for determining a frequency that the communication circuit 540 previously intents to use.

For example, the processor 550 may compare a Wi-Fi signal strength level corresponding to 2.4 GHz and a Wi-Fi signal strength level corresponding to 5 GHz and may perform frequency handover so as to use Wi-Fi of which the signal strength is better. For example, in the case where a Wi-Fi signal strength level corresponding to 5 GHz is lower than that corresponding to 2.4 GHz due to location movement, and the like of the electronic device 410 using 5 GHz, the processor 550 may change a frequency such that the communication circuit 540 uses 2.4 GHz. In contrast, in the case where a Wi-Fi signal strength level corresponding to 2.4 GHz is lower than that corresponding to 5 GHz due to location movement, and the like, of the electronic device 410 using 2.4 GHz, the processor 550 may change a frequency such that the communication circuit 540 uses 5 GHz of a relatively high band of which the throughput is relatively excellent.

Furthermore, the processor 550 may perform frequency handover based on at least one or more of a state of charge, current consumption, and the quantity of heat. For example, the processor 550 may select whether to regard a Wi-Fi signal strength level or throughput as valuable or whether to regard current consumption due to the use of a Wi-Fi network as valuable. In the case where a state of charge of the electronic device using 5 GHz becomes lower than a specific level or current consumption or the quantity of heat is greater than or equal to a specific level, the processor 550 may change a frequency such that the communication circuit 540 uses 2.4 GHz. Furthermore, in the case where a state of charge of the electronic device using 2.4 GHz becomes higher than a specific level or current consumption or the quantity of heat becomes lower than a specific level, the processor 550 may change a frequency such that the communication circuit 540 uses 5 GHz. Similarly, in the case where charging of a battery is detected even though a state of charge of the electronic device 410 using 2.4 GHz is not recovered to be higher than or equal to a specific level, the processor 550 may change a frequency such that the communication circuit 540 uses 5 GHz.

Furthermore, the processor 550 may perform frequency handover based on whether the communication circuit 540 uses 2.4 GHz or 5 GHz. In the communication circuit 540 using 2.4 GHz, in the case of using a 2.4 GHz BT network, the processor 550 may change a frequency such that the communication circuit 540 uses 5 GHz.

The memory 560 may store data. The memory 560 may include, for example, at least the same as or similar to the memory 130 illustrated in FIG. 1. In this case, data stored in the memory 560 may include data exchanged among components in the electronic device 410 and data exchanged between the electronic device 410 and external components of the electronic device 410.

For example, the memory 560 may store instructions which cause the first communication circuit to perform wireless communication selectively using one of the first frequency or the second frequency, based on at least a part of information associated with at least one of a state or an operation of the electronic device 410 acquired by the processor 550.

Similarly, in the case where the electronic device 410 uses a plurality of frequencies variously as well as the first and second frequencies, the memory 560 may store instructions which cause the first communication circuit to dynamically perform wireless communication selectively using one of the plurality of frequencies, based on at least a part of information associated with at least one of a state or an operation of the electronic device 410 acquired by the processor 550.

Furthermore, a variety of information about at least one or more APs found by the AP search circuit 510 may be stored in the memory 560. A manner for displaying the dual AP 440 selected through various UIs, a manner for arranging found APs, or a manner for using a frequency about the dual AP 440 may be stored in the memory 560.

The memory 560 may include, for example, a hard disk drive existing inside or outside the electronic device 410, a ROM, a RAM, a flash memory, a memory card, and the like.

It may be understood that at least two or more of the AP search circuit 510, the display circuit 520, the user input receiving circuit 530, the communication circuit 540, the processor 550, and the memory 560 are integrated together or that at least one thereof is implemented with sub-modules. Although not illustrated in FIG. 5, the AP search circuit 510, the display circuit 520, the user input receiving circuit 530, the communication circuit 540, the processor 550, and the memory 560 may be interconnected through a bus for exchange of control signals. Furthermore, at least a part of operations performed on the AP search circuit 510, the display circuit 520, the user input receiving circuit 530, the communication circuit 540, and the memory 560 may be performed on the processor 550.

Figure 6:
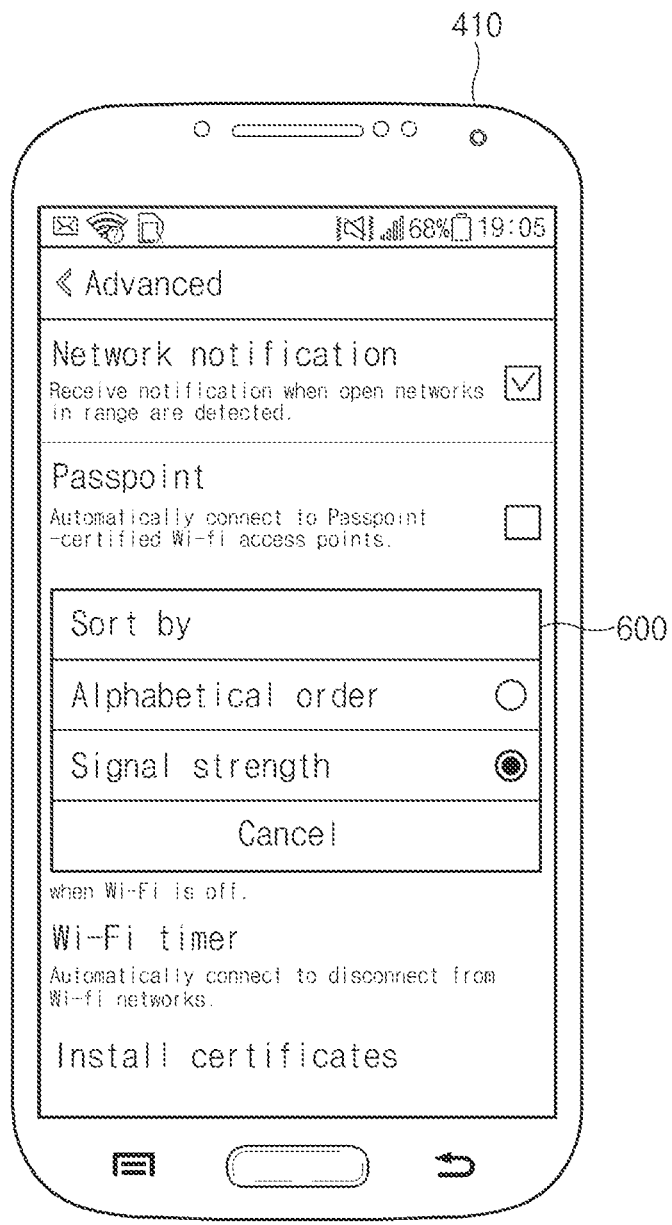
FIG. 6 is a diagram schematically illustrating a user interface for access point (AP) list arrangement displayed on a screen of an electronic device according to various embodiments of the present disclosure.

FIG. 6 is a diagram schematically illustrating a user interface for AP list arrangement displayed on a screen of an electronic device according to various embodiments of the present disclosure.

Referring to FIG. 6, the display circuit 520 of FIG. 5 may display a UI 600 for AP list arrangement on a screen through a user input.

Referring to the UI 600 for AP list arrangement, at least one or more APs may be arranged based on a Wi-Fi signal strength level or an alphabetical order of names thereof. The electronic device 410 may set an arrangement method about the at least one or more APs through the UI 600 for AP list arrangement before searching for the at least one or more APs.

Furthermore, the at least one or more APs arranged according to at least one condition may be rearranged according to another condition through a user input. Accordingly, after the at least one or more APs are found, the UI 600 for AP list arrangement illustrated in FIG. 6 may be displayed on a screen through a user input and may be rearranged according to another condition through the UI 600 for AP list arrangement.

Figure 7:
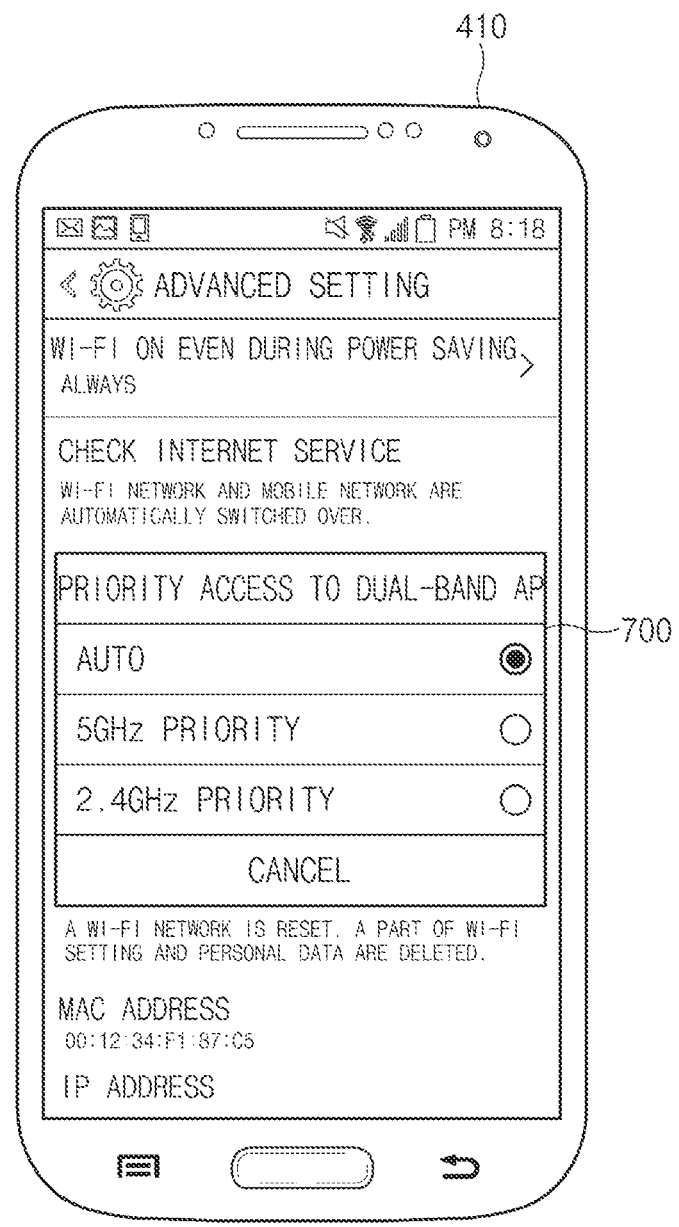
FIG. 7 is a diagram schematically illustrating a user interface for dual AP selection displayed on a screen of an electronic device according to various embodiments of the present disclosure.

FIG. 7 is a diagram schematically illustrating a user interface for dual AP selection displayed on a screen of an electronic device according to various embodiments of the present disclosure.

Referring to FIG. 7, the display circuit 530 of FIG. 5 may display a UI 700 for dual AP selection through a user input.

Referring to the UI 700 for dual AP selection, the dual AP 440 which is determined as being used on the communication circuit 540 of the electronic device 410 may be connected according to various conditions. For example, the UI 700 for dual AP selection may make it possible to select a first case where a frequency of 2.4 GHz is always used, a second case where a frequency of 5 GHz is always used, and a third case where 2.4 GHz or 5 GHz is used according to a state of the electronic device 410.

An electronic device according to various embodiments of the present disclosure which include a first communication circuit configured to perform wireless communication with an external electronic device, based on a first communication protocol in which the wireless communication is possible using one or more of a first frequency or a second frequency, a processor electrically connected to the communication circuit, and a memory electrically connected to the processor. The memory may store instructions, the instructions, when executed, causing the processor to acquire information associated with at least one of a state or an operation of the electronic device and the first communication to perform the wireless communication selectively using one of the first frequency or the second frequency, based on at least a part of the acquired information.

According to various embodiments of the present disclosure, the external electronic device may include an AP.

According to various embodiments of the present disclosure, the first communication protocol is an 802.11 protocol. Furthermore, the first frequency may be about 2.4 GHz and the second frequency may be about 5 GHz.

According to various embodiments of the present disclosure, the electronic device may further include a second communication circuit configured to perform the wireless communication with the external electronic device, based on a second communication protocol in which the wireless communication is possible in a frequency domain the same as or similar to the first frequency. The state or the operation of the electronic device may include an operation of the second communication circuit.

According to various embodiments of the present disclosure, the second communication protocol may include a Bluetooth protocol.

According to various embodiments of the present disclosure, the state or the operation of the electronic device may include at least one of a temperature, a battery charging operation, current consumption, and the quantity of heat of the electronic device.

According to various embodiments of the present disclosure, the electronic device may further include a display electrically connected to the processor, and the display may display information associated with the at least one external electronic device connectable using the first communication circuit.

According to various embodiments of the present disclosure, the at least one external electronic device which is connectable using the first communication circuit and is displayed by the display may be arranged and displayed based on at least a part of the acquired information.

According to various embodiments of the present disclosure, the at least one external electronic device connectable using the first communication circuit may be arranged and displayed for a signal strength level.

According to various embodiments of the present disclosure, in a multi-frequency device, corresponding to the first frequency and the second frequency, from among the at least one external electronic device, the display may display information associated with the first frequency of the multi-frequency device and information associated with the second frequency thereof as independent objects, respectively.

According to various embodiments of the present disclosure, the electronic device may further include a user input receiving circuit electrically connected to the processor. In this case, the user input receiving circuit may receive a user input selecting one of the at least one external electronic device connectable, and the processor may allow the first communication to perform the wireless communication with the selected external electronic device.

According to various embodiments of the present disclosure, if a multi-frequency device is selected through the user input, the wireless communication with the selected external electronic device which the first communication circuit performs may be performed using one of the first frequency and the second frequency, based on signal strength levels about the first and second frequencies.

According to various embodiments of the present disclosure, if the signal strength levels about the first and second frequencies are the same, the wireless communication with the selected external electronic device which the first communication circuit performs may be performed using one of the first frequency and the second frequency, based on a throughput about each of the first and second frequencies.

According to various embodiments of the present disclosure, if the acquired information is changed, the processor may change the first frequency or the second frequency, which is used for the first communication circuit to perform the wireless communication, into another frequency based on at least a part of the changed information.

According to various embodiments of the present disclosure, a change in a frequency which the first communication circuit used may be performed with respect to the case that a multi-frequency device is selected through the user input.

An electronic device according to various embodiments of the present disclosure may include a first communication circuit configured to perform wireless communication with an external electronic device, based on a first communication protocol in which the wireless communication is possible using one or more of a plurality of frequencies, a processor electrically connected to the communication circuit, and a memory electrically connected to the processor. The memory may store instructions, the instructions, when executed, causing the processor to acquire information associated with at least one of a state or an operation of the electronic device and the first communication to dynamically perform the wireless communication selectively using one of the plurality of frequencies, based on at least a part of the acquired information.

According to various embodiments of the present disclosure, an electronic device may include an AP search module configured to search for a connectable AP, a display module configured to display the found at least one or more APs, a user input receiving module configured to receive a user input, which is used to select a dual AP supporting both a first frequency and a second frequency, from among the found at least one or more APs, and a communication module configured to perform communication using one of the first frequency and the second frequency, based on a user setting, as a response to the user input. For example, the first frequency may be 2.4 GHz, and the second frequency may be 5 GHz.

According to various embodiments of the present disclosure, the user setting may include a first case in which the first frequency is always used, a second case in which the second frequency is always used, and a third case in which the first frequency or the second frequency is used according to a state of the electronic device.

According to various embodiments of the present disclosure, the electronic device may further include a processor configured to determine a frequency, which is to be used on the communication module, from among the first and second frequencies, if the user setting corresponds to the third case.

According to various embodiments of the present disclosure, an operation in which the processor determines a frequency to be used on the communication module may be performed by a communication signal strength level when the first frequency is used and a communication signal strength level when the second frequency is used. If the communication signal strength level when the first frequency is used is the same as the communication signal strength level when the second frequency is used, the processor may determine to use a frequency, having a relatively high throughout, from among the first and second frequencies, as a frequency to be used on the communication module.

According to various embodiments of the present disclosure, the operation in which the processor determines a frequency to be used on the communication module may be performed based on at least one of a state of charge, current consumption, and the quantity of heat of the electronic device.

Furthermore, according to various embodiments of the present disclosure, the operation in which the processor determines a frequency to be used on the communication module may be performed based on whether a BT network of the communication module is usable.

According to various embodiments of the present disclosure, the processor may hand the first frequency or the second frequency, which is determined as the communication module uses, over to the second frequency or the first frequency.

According to various embodiments of the present disclosure, an operation in which the processor determines a frequency to be used on the communication module may be performed by a communication signal strength level when the first frequency is used and a communication signal strength level when the second frequency is used.

According to various embodiments of the present disclosure, in the case where the communication module is using a Wi-Fi network corresponding to 2.4 GHz, an operation in which the processor changes a frequency to be used on the communication module may be to use 5 GHz of a high band of which the throughout is relatively excellent as a Wi-Fi signal strength level corresponding to 2.4 GHz becomes lower than a Wi-Fi signal strength level corresponding to 5 GHz.

Furthermore, according to various embodiments of the present disclosure, the operation in which the processor changes a frequency to be used on the communication module may be performed based on at least one of a state of charge, current consumption, and the quantity of heat of the electronic device. Similarly, the operation in which the processor changes a frequency to be used on the communication module may be performed if charging of a battery of the electronic device is detected.

According to various embodiments of the present disclosure, also, the operation in which the processor changes a frequency to be used on the communication module may be performed based on whether a BT network of the communication module is usable.

According to various embodiments of the present disclosure, the found at least one or more APs may be arranged and displayed for a communication signal strength level.

According to various embodiments of the present disclosure, a dual AP, which supports both the first frequency and the second frequency, from among the found at least one or more APs may be displayed such that an AP about the first frequency and an AP about the second frequency are independently displayed.

According to various embodiments of the present disclosure, the display module may display a user interface for determining whether to display the dual AP supporting both the first frequency and the second frequency as one AP or whether to display an AP about the first frequency and an AP about the second frequency independently.

According to various embodiments of the present disclosure, the display module may display a user interface for arranging the found at least one or more APs in a communication signal strength level order or in an alphabetic order.

Figure 8A:
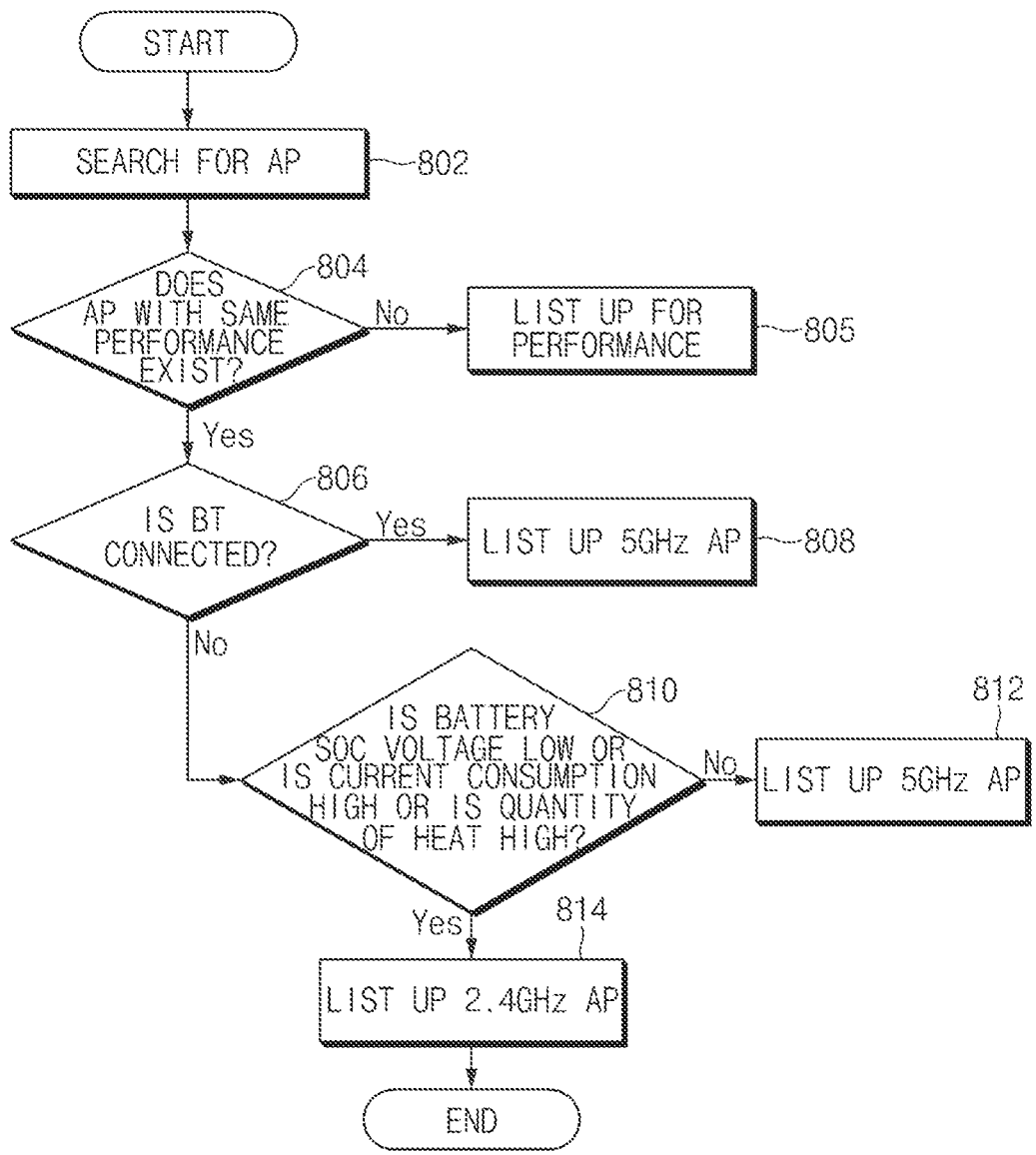
FIG. 8A is a flowchart schematically illustrating an AP arrangement method according to various embodiments of the present disclosure.

FIG. 8A is a flowchart schematically illustrating an AP arrangement method according to various embodiments of the present disclosure.

Referring to FIG. 8A, an AP arrangement method according to various embodiments of the present disclosure may include operations which are processed in a time sequential manner on the electronic device 410, the first AP, 420, the second AP 430, the dual AP 440, a BT device 450, and the network 460 illustrated in FIGS. 1 to 7. Although omitted below, a description about the electronic device 410, the first AP, 420, the second AP 430, the dual AP 440, a BT device 450, and the network 460 given with reference to FIGS. 1 to 7 may be applied to the AP arrangement method illustrated in FIG. 8A.

Referring to FIG. 8A, in operation 802, the electronic device 410 may search for at least one or more APs including at least one of the first AP, 420, the second AP 430, and the dual AP 440.

According to various embodiments of the present disclosure, the electronic device 410 may display the APs found in operation 802 such that APs with the same Wi-Fi signal strength level and APs with different Wi-Fi signal strength levels are displayed independently.

In operation 804, the electronic device 410 determines presence of any APs with the same performance and APs, having the same Wi-Fi signal strength level, from among the found APs and may be processed to operation 806. In contrast, APs, having different Wi-Fi signal strength levels, from among the found APs may be arranged according to Wi-Fi signal strength levels in operation 805.

According to various embodiments of the present disclosure, in operation 806, the electronic device 410 may determine whether another network of which a frequency is duplicated with that of the electronic device 410 is used thereon. Another network may indicate a second network in which at least one of at least one or more frequencies usable as a frequency of a first network (e.g., a Wi-Fi network) on the electronic device 410 is used. For example, in the case where the electronic device 410 is using the BT network as another network using the duplicated frequency, operation 806 may proceed to operation 808. In contrast, in the case where the electronic device 410 does not use the BT network, operation 806 may proceed to operation 810.

According to various embodiments of the present disclosure, in operation 808, the electronic device 410 may display an AP, having relatively excellent throughput, from among APs with the same Wi-Fi signal strength level determined in operation 804 at a location higher than another AP (e.g., an AP supporting 2.4 GHz).

According to various embodiments of the present disclosure, in operation 810, the electronic device 410 may determine whether a state of charge of the electronic device 410 is lower than a specific level or current consumption or the quantity of heat is greater than a specific level.

According to various embodiments of the present disclosure, in the case where the determination result of operation 810 indicates that the state of charge of the electronic device 410 is lower than the specific level or the current consumption or the quantity of heat is greater than the specific level, in operation 812, the electronic device 410 may display an AP supporting 5 GHz at a location higher than an AP supporting 2.4 GHz.

According to various embodiments of the present disclosure, in the case where the determination result of operation 810 indicates that the state of charge of the electronic device 410 is higher than or equal to the specific level or the current consumption or the quantity of heat is lower than the specific level, in operation 814, the electronic device 410 may display an AP supporting 2.4 GHz at a location higher than an AP supporting 5 GHz.

An order of operations 802 to 814 illustrated in FIG. 8A are not limited thereto. For example, an order of operations 802 to 814 may be changed variously, and some of operations 802 to 814 may be performed at the same time. For example, operation 806 may be performed after operation 810 is performed.

Furthermore, the above-described operations may be repeated periodically, that is, every set time or may be again performed based on a user input.

Figure 8B:
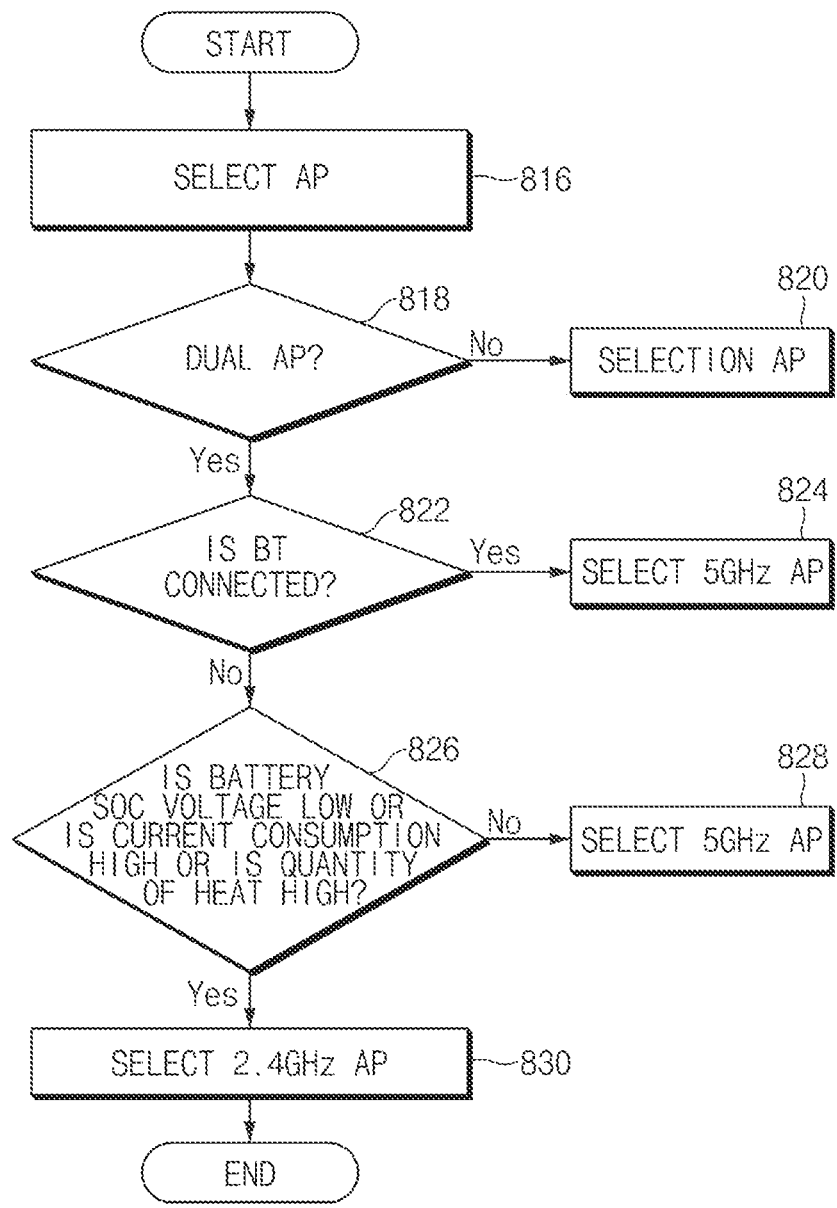
FIG. 8B is a flowchart schematically illustrating a Wi-Fi communication method according to various embodiments of the present disclosure.

FIG. 8B is a flowchart schematically illustrating a Wi-Fi communication method according to various embodiments of the present disclosure.

Referring to FIG. 8B, a Wi-Fi communication method according to various embodiments of the present disclosure may include operations which are processed in a time sequential manner on the electronic device 410, the first AP, 420, the second AP 430, the dual AP 440, a BT device 450, and the network 460 illustrated in FIGS. 1 to 7. Although omitted below, a description about the electronic device 410, the first AP, 420, the second AP 430, the dual AP 440, a BT device 450, and the network 460 given with reference to FIGS. 1 to 7 may be applied to the Wi-Fi communication method illustrated in FIG. 8B.

Referring to FIG. 8B, in operation 816, the electronic device 410 may receive a selection input about one of at least one or more APs arranged in FIG. 8A.

According to various embodiments of the present disclosure, in operation 818, the electronic device 410 may determine whether an AP selected in operation 816 is the dual AP 440. If an AP selected in operation 816 is not the dual AP 440, in operation 820, the electronic device 410 may perform Wi-Fi communication through the selected AP. If an AP selected in operation 816 is the dual AP 440, operation 818 may proceed to operation 822.

According to various embodiments of the present disclosure, in operation 822, the electronic device 410 may determine whether the electronic device 410 is using the BT network. In the case where the determination result indicates that the electronic device 410 is using the BT network, in operation 824, the electronic device 410 may perform Wi-Fi communication using 5 GHz. In the case where the determination result indicates that the electronic device 410 does not use the BT network, operation 822 may proceed to operation 826.

According to various embodiments of the present disclosure, in operation 826, the electronic device 410 may determine whether a state of charge of the electronic device 410 is lower than a specific level or current consumption or the quantity of heat is higher than a specific level. In the case where the determination result indicates that the state of charge of the electronic device 410 is higher than or equal to the specific level or the current consumption or the quantity of heat is lower than the specific level, in operation 828, the electronic device 410 may perform Wi-Fi communication using 5 GHz.

In the case where the determination result indicates that the state of charge of the electronic device 410 is lower than the specific level or the current consumption or the quantity of heat is higher than the specific level, in operation 830, the electronic device 410 may perform Wi-Fi communication using 2.4 GHz.

An order of operations 816 to 830 illustrated in FIG. 8B are not limited thereto. For example, an order of operations 802 to 814 may be changed variously, and some of operations 816 to 830 may be performed at the same time. For example, operation 822 may be performed after operation 826 is performed. Furthermore, operations 824, 828, and 830 for determining whether to perform communication using 2.4 GHz or 5 GHz may be performed based on results of performing operations 822 and 826.

Furthermore, the above-described operations may be repeated periodically, that is, every set time or may be again performed based on a user input.

Figure 9:
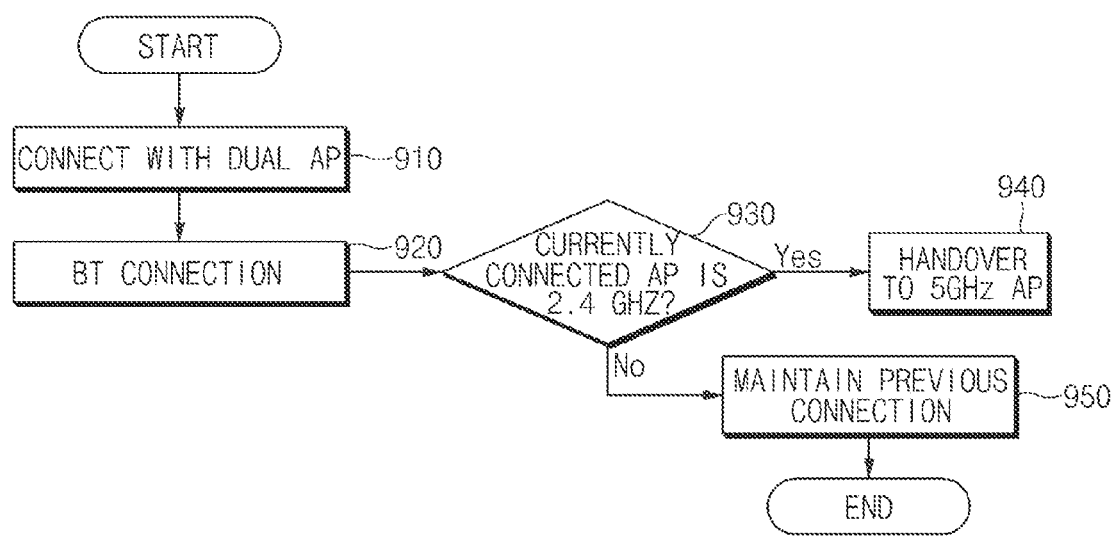
FIG. 9 is a flowchart schematically illustrating a method for performing handover about frequencies used during Wi-Fi communication according to various embodiments of the present disclosure.
Figure 10:
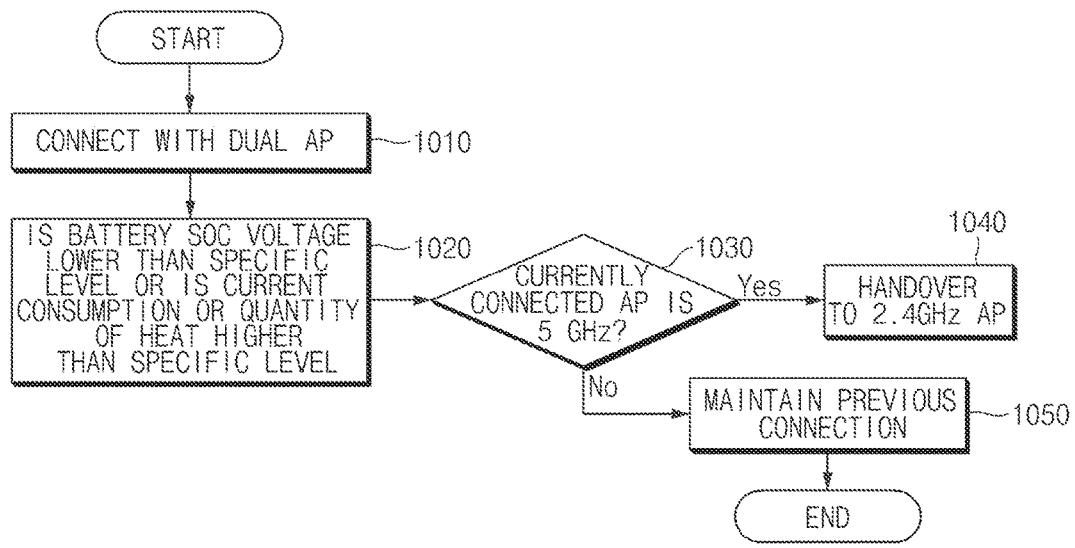
FIG. 10 is a flowchart schematically illustrating a method for performing handover about frequencies used during Wi-Fi communication according to various embodiments of the present disclosure.
Figure 11:
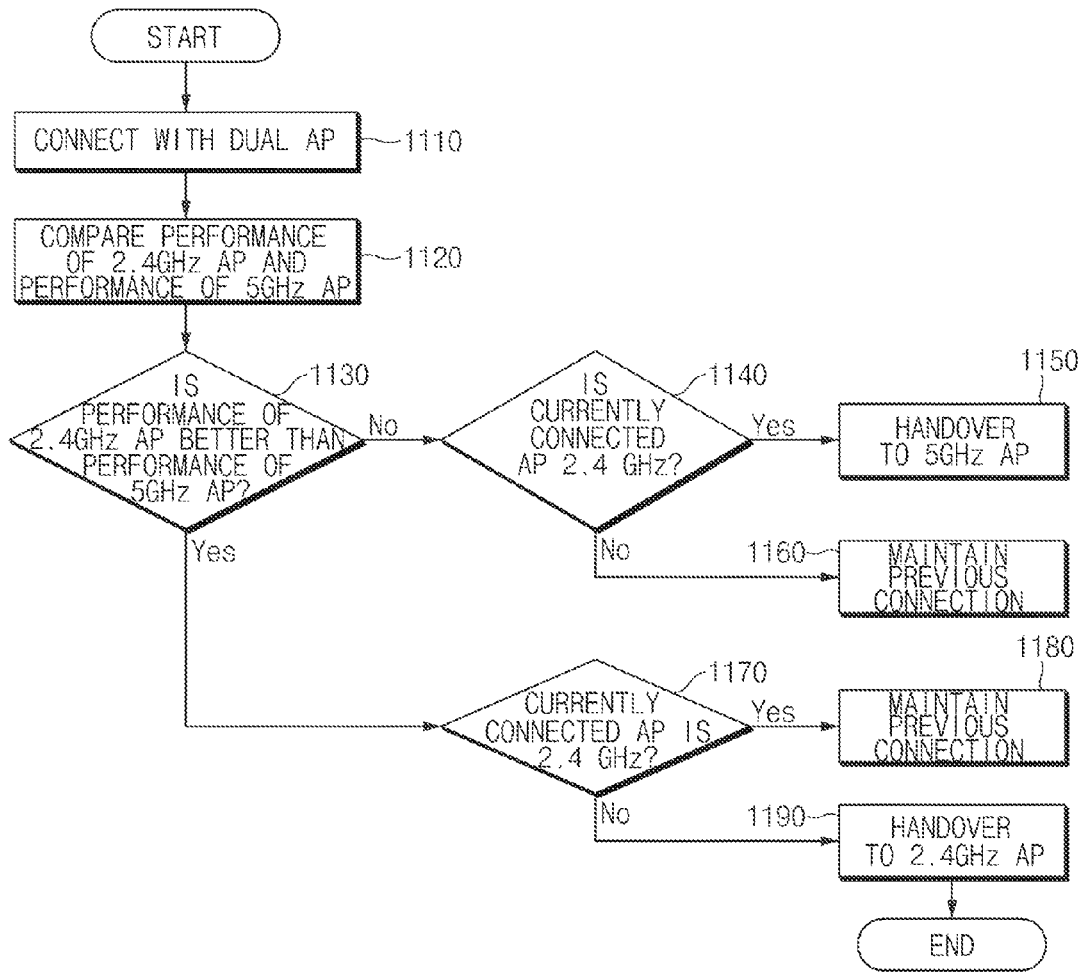
FIG. 11 is a flowchart schematically illustrating a method for performing handover about frequencies used during Wi-Fi communication according to various embodiments of the present disclosure.

FIGS. 9, 10, and 11 are flowcharts schematically illustrating a method for performing handover about frequencies used during Wi-Fi communication according to various embodiments of the present disclosure.

Referring to FIGS. 9, 10, and 11, a handover method according to various embodiments of the present disclosure may include operations which are processed in a time sequential manner on the electronic device 410, the first AP, 420, the second AP 430, the dual AP 440, a BT device 450, and the network 460 illustrated in FIGS. 1 to 7. Although omitted below, a description about the electronic device 410, the first AP, 420, the second AP 430, the dual AP 440, a BT device 450, and the network 460 given with reference to FIGS. 1 to 7 may be applied to the handover method illustrated in FIGS. 9, 10, and 11.

Referring to FIG. 9, in operation 910, the electronic device 410 may be connected to the dual AP 440 and may perform first network (e.g., a Wi-Fi network) communication.

In operation 920, the electronic device 410 may use at least one of usable frequencies of the dual AP 440 as a second network (e.g., a BT network). In operation 930, the electronic device 410 may determine whether current connection with the dual AP 440 is made using 2.4 GHz. In the case where the determination result indicates that current connection with the dual AP 440 is made using 2.4 GHz, in operation 940, the electronic device 410 may again connect with the dual AP 440 using 5 GHz.

In the case where the determination result indicates that current connection with the dual AP 440 is not made using 2.4 GHz, in operation 950, the electronic device 410 may maintain previous connection.

Referring to FIG. 10, in operation 1010, the electronic device 410 may connect with the dual AP 440 and may perform Wi-Fi communication.

According to various embodiments of the present disclosure, in operation 1020, a state of the electronic device 410 may be changed into a state where a state of charge of the electronic device 410 becomes lower than a specific level or current consumption or the quantity of heat becomes higher than a specific level.

According to various embodiments of the present disclosure, in operation 1030, the electronic device 410 may determine whether current connection with the dual AP 440 is made using 5 GHz. In the case where the determination result indicates that current connection with the dual AP 440 is made using 5 GHz, in operation 1040, the electronic device 410 may again connect with the dual AP 440 using 2.4 GHz.

In the case where the determination result indicates that current connection with the dual AP 440 is not made using 5 GHz, in operation 1050, the electronic device 410 may maintain previous connection.

Referring to FIG. 11, in operation 1110, the electronic device 410 may connect with the dual AP 440 and may perform Wi-Fi communication.

According to various embodiments of the present disclosure, in operation 1120, the electronic device 410 may compare a Wi-Fi signal strength level when 2.4 GHz is used with a Wi-Fi signal strength level when 5 GHz is used. In the case where the comparison result indicates that a Wi-Fi signal strength level when 2.4 GHz is used is not relatively good, operation 1130 may proceed to operation 1140. In contrast, in the case where the comparison result indicates that a Wi-Fi signal strength level when 2.4 GHz is used is relatively good, operation 1130 may proceed to operation 1170.

According to various embodiments of the present disclosure, in operation 1140, the electronic device 410 may determine whether current connection with the dual AP 440 is made using 2.4 GHz. In the case where the determination result indicates that current connection with the dual AP 440 is made using 2.4 GHz, in operation 1150, the electronic device 410 may again connect with the dual AP 440 using 5 GHz. In the case where the determination result indicates that current connection with the dual AP 440 is not made using 2.4 GHz, in operation 1160, the electronic device 410 may maintain previous connection.

According to various embodiments of the present disclosure, in operation 1170, the electronic device 410 may determine whether current connection with the dual AP 440 is made using 2.4 GHz. In the case where the determination result indicates that current connection with the dual AP 440 is made using 2.4 GHz, in operation 1180, the electronic device 410 may maintain previous connection. In the case where the determination result indicates that current connection with the dual AP 440 is not made using 2.4 GHz, in operation 1190, the electronic device 410 may again connect with the dual AP 440 using 2.4 GHz.

According to various embodiments of the present disclosure, a computer readable recording media may be recorded with an instruction, the instruction, when executed by at least one processor, causing the computer to perform a method including acquiring information associated with at least one of a state or an operation of an electronic device, selecting one of a first frequency or a second frequency based on at least a part of the acquired information, and performing wireless communication through a first communication circuit using the selected frequency.

According to various embodiments of the present disclosure, the state or the operation of the electronic device may include at least one of a temperature, a state of charge, a battery charging operation, current consumption, and the quantity of heat.

According to various embodiments of the present disclosure, the state or the operation of the electronic device may include an operation of a second communication circuit which is configured to perform the wireless communication with an external electronic device in a frequency domain the same as or similar to the first frequency.

According to various embodiments of the present disclosure, a communication method of an electronic device may include searching for a connectable AP, displaying the found at least one or more APs, receiving a user input, which is used to select a dual AP supporting both a first frequency and a second frequency, from among the found at least one or more APs, and performing communication using one of the first frequency and the second frequency, based on a user setting, as a response to the user input.

According to various embodiments of the present disclosure, the user setting may include a first case in which the first frequency is always used, a second case in which the second frequency is always used, and a third case in which the first frequency or the second frequency is used according to a state of the electronic device.

According to various embodiments of the present disclosure, the communication method may further include determining a frequency, which is to be used on the communication module, from among the first and second frequencies, if the user setting corresponds to the third case.

According to various embodiments of the present disclosure, the communication method may further include handing the first frequency or the second frequency, which is determined as the communication module uses, over to the second frequency or the first frequency.

According to various embodiments of the present disclosure, the communication method may further include displaying a user interface for determining whether to display the dual AP supporting both the first frequency and the second frequency as one AP or whether to display an AP about the first frequency and an AP about the second frequency independently.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

The terms "unit", "logic", "logical block", "component", "circuit", and the like, may be used together.

At least a portion of an apparatus (e.g., modules or functions thereof) or a method (e.g., operations) according to various embodiments of the present disclosure may be, for example, implemented by instructions stored in a computer-readable storage media in the form of a program module. The instruction, when executed by one or more processors (e.g., a processor 120), may cause the one or more processors to perform a function corresponding to the instruction. The computer-readable storage media, for example, may be the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point, it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. In addition, a portion of operations may be executed in different sequences, omitted, or other operations may be added.

According to various embodiments of the present disclosure, an electronic device and a method thereof may perform Wi-Fi communication among various kinds of external electronic devices supporting different frequencies, for example, APs. For example, a first communication module of the electronic device may select and use a fit frequency (e.g., 2.4 GHz or 5 GHz) based on at least a part of a state or an operation of the electronic device, thereby utilizing an optimal frequency suitable for a situation.

The state or the operation of the electronic device may include at least one of a power state, a temperature, a state of charge, a batter charging operation, current consumption, and a heat level. Furthermore, the state or the operation of the electronic device may further include whether a frequency used on the first communication module is used on a second communication circuit (e.g., a Bluetooth communication module).

Accordingly, the electronic device according to various embodiments of the present disclosure may apply factors important to use Wi-Fi, such as throughput, current consumption, BT co-existence, more efficiently.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a first communication circuit configured to perform first wireless communication based on a first communication protocol, the first wireless communication comprising communication in a first frequency band from among the first communication band and a second frequency band of the first communication protocol;
a second communication circuit configured to perform second wireless communication based on a second communication protocol, the second wireless communication comprising communication in a third frequency band that overlaps or is adjacent to the first frequency band;
a display circuit;
at least one processor electrically connected to the first communication circuit and the second communication circuit; and
a memory electrically connected to the at least one processor,
wherein the memory is configured to store instructions, the instructions, when executed, causing the at least one processor to:
discover at least one external electronic device being connectable based on the first communication circuit, wherein each of the at least one external electronic device uses at least one of the first frequency band or the second frequency band,
if signal strength levels from the at least one external electronic device are different, cause the display circuit to display information associated with the at least one external electronic device in order of the signal strength levels, and
if the signal strength levels from the at least one external electronic device are substantially the same:

identify whether the second communication circuit performs the second wireless communication in the third frequency band, and control the first communication circuit to perform the first wireless communication with an external electronic device which uses the second frequency band among the at least one external electronic device, upon identifying that the second communication circuit performs the second wireless communication in the third frequency band.

2. The electronic device of claim 1, wherein the at least one external electronic device comprises an access point (AP) apparatus.

3. The electronic device of claim 1, wherein the first communication protocol is an 802.11 protocol.

4. The electronic device of claim 3,
wherein the first frequency band is a 2.4 GHz frequency band of the 802.11 protocol, and
wherein the second frequency band is a 5 GHz frequency band of the 802.11 protocol.

5. The electronic device of claim 3, wherein the second communication protocol comprises a Bluetooth (BT) protocol.

6. The electronic device of claim 1, wherein the at least one processor is further configured to:
acquire information associated with an operation of the electronic device, comprising at least one of a state of charge, a temperature, a battery charging operation, a current consumption, or a quantity of heat, of the electronic device, and
control the first communication circuit to perform the first wireless communication in one of the first frequency band or the second frequency band, based on the information associated with an operation of the electronic device.

7. The electronic device of claim 1, further comprising:
a user input receiving circuit electrically connected to the at least one processor, the user input receiving circuit configured to:
receive a user input selecting one of the at least one external electronic device,
wherein the at least one processor is further configured to:
perform the first wireless communication with a first external electronic device among the at least one external electronic device, upon determining that the first external electronic device is selected, and
perform the second wireless communication with a second external electronic device among the at least one external electronic device, upon determining that the second external electronic device is selected.

8. The electronic device of claim 7, wherein the at least one processor is further configured to:
determine that the selected one of the at least one external electronic device communicates in the first frequency band and the second frequency band; and
perform a wireless communication with the selected one of the at least one external electronic device based on corresponding signal strength levels of the first frequency band and the second frequency band.

9. At least one non-transitory computer readable recording medium for storing a computer program configured to be readable by at least one processor of an electronic device, for instructing the at least one processor to execute the computer program, comprising:
controlling a first communication circuit of the electronic device to perform a first wireless communication in a first frequency band from among the first frequency band and a second frequency band of a first communication protocol;
discovering at least one external electronic device being connectable based on the first communication circuit, wherein each of the at least one external electronic device uses at least one of the first frequency band or the second frequency band,
if signal strength levels from the at least one external electronic device are different, displaying information associated with the at least one external electronic device in order of the signal strength levels, and
if the signal strength levels from the at least one external electronic device are substantially the same:
identifying whether a second communication circuit of the electronic device is operating, wherein the second communication circuit configured to perform second wireless communication based on a second communication protocol, the second wireless communication comprising communication in a third frequency band that overlaps or is adjacent to the first frequency band, and
upon identifying that the second communication circuit performs the second wireless communication in the third frequency band, controlling the first communication circuit to perform the first wireless communication with an external electronic device which uses the second frequency band among the at least one external electronic device.

10. The at least one non-transitory computer readable recording medium of claim 9, wherein the at least one processor is further instructed for:
acquiring information associated with an operation of the electronic device, comprising at least one of a state of charge, a temperature, a battery charging operation, a current consumption, or a quantity of heat, of the electronic device.

11. The at least one non-transitory computer readable recording medium of claim 9,
wherein the first communication protocol is an 802.11 protocol,
wherein the first frequency range is a 2.4 GHz frequency range of the 802.11 protocol, and
wherein the second frequency range is a 5 GHz frequency range of the 802.11 protocol.

12. The at least one non-transitory computer readable recording medium of claim 11, wherein the second communication protocol comprises a Bluetooth (BT) protocol.

* * * * *